US012259926B2

(12) United States Patent
Fernandes et al.

(10) Patent No.: US 12,259,926 B2
(45) Date of Patent: Mar. 25, 2025

(54) COMPUTER SYSTEMS AND METHODS FOR BUILDING AND ANALYZING DATA GRAPHS

(71) Applicant: Discover Financial Services, Riverwoods, IL (US)

(72) Inventors: Kenrick Fernandes, Wheeling, IL (US); Ashkan Golgoon, Glenview, IL (US); Arjun Ravi Kannan, Buffalo Grove, IL (US)

(73) Assignee: Discover Financial Services, Riverwoods, IL (US)

( * ) Notice: Subject to any disclaimer, the term of this patent is extended or adjusted under 35 U.S.C. 154(b) by 159 days.

(21) Appl. No.: 18/304,272

(22) Filed: Apr. 20, 2023

(65) Prior Publication Data

US 2024/0354344 A1 Oct. 24, 2024

(51) Int. Cl.
*G06F 16/901* (2019.01)
(52) U.S. Cl.
CPC ................... *G06F 16/9024* (2019.01)
(58) Field of Classification Search
CPC .................................................. G06F 16/9024
See application file for complete search history.

(56) References Cited

U.S. PATENT DOCUMENTS

| 2021/0326389 | A1 | 10/2021 | Sankar et al. |
| 2022/0286416 | A1 | 9/2022 | Cao et al. |
| 2022/0318715 | A1 | 10/2022 | Goel et al. |
| 2022/0382741 | A1* | 12/2022 | Sznajdman ......... G06F 16/9024 |
| 2023/0162051 | A1* | 5/2023 | Lv ........................ G06F 18/214 |
| | | | 706/12 |

OTHER PUBLICATIONS

International Searching Authority. International Search Report and Written Opinion issued in International Application No. PCT/US2024/025706, mailed on Aug. 5, 2024, 10 pages.
Svenningsson, Josef et al. Combining Deep and Shallow Embedding for EDSL. Proceedings of the 2012 Conference on Trends in Functional Programming. 2012. 16 pages.
Ying et al., GNNExplainer: Generating Explanations for Graph Neural Networks. <URL:https://arxiv.orgpdf/1903.03894v4.pdf>, Nov. 13, 2019, 13 pages.
Yuan et al., Explainability in graph neural networks: a taxonomic survey, IEEE Transactions on Pattern Analysis and Machine Intelligence, <URL:https://arxiv.org/pdf/2012.15445.pdf>, Jul. 1, 2022, 19 pages.

(Continued)

*Primary Examiner* — Cam Y T Truong
(74) *Attorney, Agent, or Firm* — Lee Sullivan Shea & Smith LLP

(57) ABSTRACT

A computing platform may be configured to (i) obtain an input dataset, (ii) construct a graph from the input dataset, (iii) for a given node within the constructed graph, generate a first type of embedding vector using a first embedding technique (e.g., a shallow embedding technique) and a second type of embedding vector using a second embedding technique that differs from the first embedding technique (e.g., a deep embedding technique), and (iv) use the first and second types of embedding vectors for the given node and a data science model to render a given prediction for the given node.

20 Claims, 7 Drawing Sheets

(56) References Cited

OTHER PUBLICATIONS

DeepFindr. How to Explain Graph Neural Networks (with XAI) <URL:https://www.youtube.com/watch?v=NvDM2j8Jgvk>, Oct. 21, 2021, 2 pages.

Pope et al., Explainability methods for graph convolutional neural networks, Proceedings of the IEEE/CVF Conference on Computer Vision and Pattern Recognition, <URL: https://openaccess.thecvf.com/content_CVPR_2019/papers/Pope_Explainability_Methods_for_Graph_Convolutional_Neural_Networks_CVPR_2019_paper.pdf>, Jun. 1, 2019, pp. 10772-10781.

Yuan et al., On explainability of graph neural networks via subgraph explorations, International Conference on Machine <URL:https://arxiv.org/pdf/2102.05152.pdf>, May 31, 2021, pp. 12241-12252.

Schnake et al., Higher-Order Explanations of Graph Neural Networks via Relevant Walks, IEEE Transactions on Pattern Analysis and Machine Intelligence <URL:https://arxiv.org/pdf/2006.03589.pdf>, Nov. 27, 2020, 20 pages.

Yuan et al., XGNN: Towards model-level explanations of graph neural networks, Proceedings of the 26th ACM SIGKDD International Conference on Knowledge Discovery & Data Mining, <URL:https://dl.acm.org/doi/pdf/10.1145/3394486.3403085> 2020, 9 pages.

Khazane, Anish, et al. "Deeptrax: Embedding graphs of financial transactions." 2019 18th IEEE International Conference on Machine Learning And Applications (ICMLA). <URL:arXiv:1907.07225v1.pdf> Jul. 16, 2019, 8 pages.

Van Belle, Rafaël, et al. "Inductive Graph Representation Learning for fraud detection." Expert Systems with Applications <URL:https://creativecommons.org/licenses/by-nc-nd/4.0/>, 2022, 13 pages.

Huang et al. "Graphlime: Local Interpretable Model Explanations for Graph Neural Networks", IEEE Transactions on Knowledge and Data Engineering. vol. 35, No. 7. Jul. 7, 2023, 5pages.

Hamilton et al. Inductive Representation Learning on Large Graphs. Advances in neural information processing systems 30. 31st Annual Conference on Neural Information Processing Systems <URL:https://arxiv.org/pdf/1706.02216.pdf>, Dec. 4-9, 2017, 13 pages.

Leskovec, Dr. Jure. Large-scale Graph Representation Learning. 2017 IEEE International Conference on Big Data (BigData) Abstract, 1 page.

Jiang, Fei, et al. "Fi-grl: Fast inductive graph representation learning via projection-cost preservation." 2018 IEEE International Conference on Data Mining (ICDM). IEEE, 2018, 6 pages.

Li, Yiming, et al. "Temporal Graph Representation Learning for Detecting Anomalies in E-payment Systems." 2021 International Conference on Data Mining Workshops (ICDMW). IEEE, 2021, 8 pages.

Link prediction with Heterogeneous GraphSAGE (HinSAGE). <URL:https://stellargraph.readthedocs.io/en/latest/demos/link-prediction/hinsage-link-prediction.html>, 12 pages.

Node representation learning with Deep Graph Infomax <URL:https://stellargraph.readthedocs.io/en/latest/demos/embeddings/deep-graph-infomax-embeddings.html>, 10 pages.

Hamilton et al. Representation Learning on Graphs: Methods and Applications. <URL: https://arxiv.org/abs/1709.05584> Apr. 10, 2018, 24 pages.

\* cited by examiner

COMPUTER SYSTEMS AND METHODS FOR BUILDING AND ANALYZING DATA GRAPHS

BACKGROUND

Organizations in many different industries have begun to operate computing platforms that are configured to ingest, process, analyze, generate, store, and/or output data that is relevant to the businesses of those organizations. Such computing platforms are often referred to as "data platforms." For example, a financial institution may operate a data platform that is configured to ingest, process, analyze, generate, store, and/or output data related to the financial institution's customers and their financial accounts, such as financial transactions data (among other types of data that may be relevant to the financial institution's business). As another example, an organization interested in monitoring the state and/or operation of physical objects such as industrial machines, transport vehicles, and/or other Internet-of-Things (IoT) devices may operate a data platform that is configured to ingest, process, analyze, generate, store, and/or output data related to those physical objects of interest. As another example, a provider of a Software-as-a-Service (SaaS) application may operate a data platform that is configured to ingest, process, analyze, generate, store, and/or output data that is created in connection with that SaaS application. Many other examples are possible as well.

Data platforms such as these may provide several benefits to organizations, including but not limited to enabling organizations to achieve efficiencies in data management and analysis and enabling organizations to unlock the value of their data in ways not previously possible, which may lead to more informed business decisions and new business opportunities. Data platforms may provide various other advantages as well.

OVERVIEW

Disclosed herein is software technology that improves the process of constructing and analyzing data graphs.

In one aspect, the disclosed technology may take the form of a computer-implemented method that involves (i) obtaining an input dataset, (ii) constructing a graph from the input dataset, (iii) for a given node within the constructed graph, generating a first type of embedding vector using a first embedding technique and a second type of embedding vector using a second embedding technique that differs from the first embedding technique, and (iv) using the first and second types of embedding vectors for the given node and a data science model to render a given prediction for the given node.

The first and second embedding techniques may take any of various forms. For instance, in some example embodiments, the first embedding technique may take the form of a shallow embedding technique and the second embedding technique may take the form of a deep embedding technique.

Further, the data science model may take any of various forms. For instance, in some example embodiments, the data science model may comprise a (i) a first intermediate data science model that functions to output a first intermediate prediction for the given node based at least in part on the first type of embedding vector and (ii) a second intermediate data science model that that functions to output a second intermediate prediction for the given node based at least in part on the second type of embedding vector, wherein the outputs of the first and second intermediate data science models are combined together to produce the given prediction for the given node. In such embodiments, the function of using the first and second types of embedding vectors for the given node and the data science model to render the given type of prediction for the given node may involve inputting the first and second types of embedding vectors for the given node into the data science model and thereby causing the data science model to (i) render the first intermediate prediction, (ii) render the second intermediate prediction, and (iii) combine the first and second intermediate predictions together in order to produce the given prediction. And in such embodiments, one or both of first intermediate data science model or the second intermediate data science model may be further configured use attribute data for the node as a basis the given type of prediction that is output.

In other embodiments, the data science model may comprise a data science model that functions to render the given prediction for the given node based on a combined embedding vector for the given node that is produced based on the first and second types of embedding vectors for the given node. In such embodiments, the function of using the first and second types of embedding vectors for the given node and the data science model to render the given type of prediction for the given node may involve (i) producing the combined embedding vector for the given node based on the first and second types of embedding vectors for the given node, and (ii) inputting the combined embedding vector for the given node into the data science model and thereby causing the data science model to render the given prediction for the given node. And in such embodiments, the function of producing the combined embedding vector for the given node based on the first and second types of embedding vectors for the given node may involve (i) concatenating the first type of embedding vector and the second type of embedding vector together into a concatenated embedding vector, and (ii) inputting the concatenated embedding vector into a neural network that functions to produce a lower-dimension version of the concatenated embedding vector, wherein the lower-dimension version of the concatenated embedding vector is used as the embedding vector for the given node.

The data science model, and the function of using the first and second types of embedding vectors for the given node and the data science model to render the given type of prediction for the given node, make take other forms as well.

Further yet, the graph may take any of various forms. For instance, in some example embodiments, the graph may have a configuration that is tailored for a particular use case of the graph. In other example embodiments, the graph may comprise a heterogenous graph that includes two or more different types of nodes (e.g., two or more of customer nodes, merchant nodes, or transaction nodes).

Still further, the given prediction for the given nodes may take any of various forms, and in some example embodiments, the given prediction may be a prediction related to financial activity of a given customer of a financial institution.

In another aspect, disclosed herein is a computing platform that includes at least one network interface, at least one processor, at least one non-transitory computer-readable medium, and program instructions stored on the at least one non-transitory computer-readable medium that are executable by the at least one processor such that the computing platform is configured to carry out the functions disclosed herein, including but not limited to the functions of the foregoing method.

In yet another aspect, disclosed herein is a non-transitory computer-readable medium comprising program instructions that, when executed by at least one processor, cause a computing platform to carry out the functions disclosed herein, including but not limited to the functions of the foregoing method.

One of ordinary skill in the art will appreciate these as well as numerous other aspects in reading the following disclosure.

Figure 1:
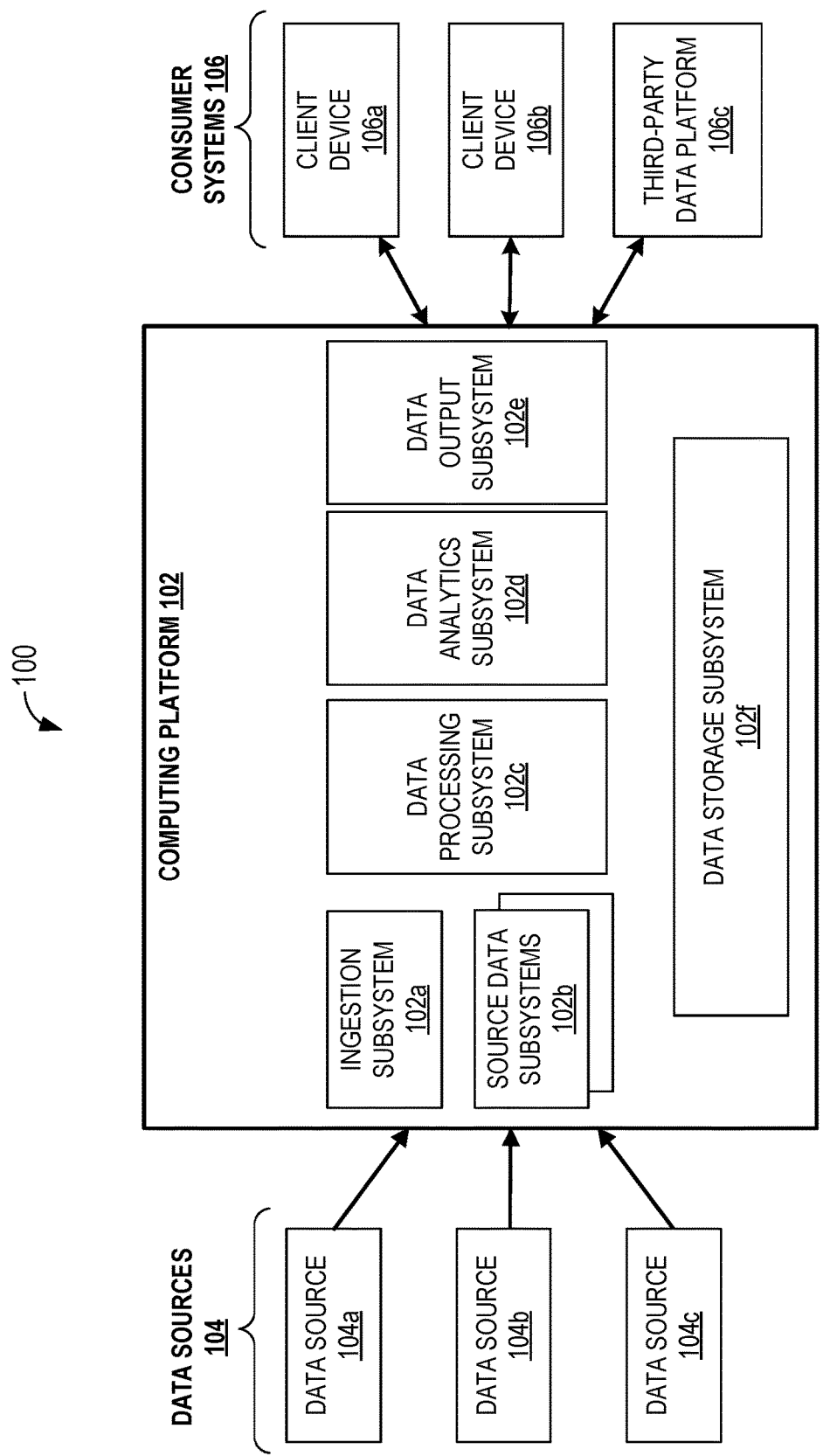
FIG. 1 depicts an example network environment in which aspects of the disclosed technology may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Environment

As noted above, organizations in many different industries have begun to operate computing platforms that are configured to ingest, process, analyze, generate, store, and/or output data that is relevant to the businesses of those organizations, which are often referred to as "data platforms." For example, a financial institution may operate a data platform that is configured to ingest, process, analyze, generate, store, and/or output data related to the financial institution's customers and their financial accounts, such as financial transactions data (among other types of data that may be relevant to the financial institution's business). As another example, an organization interested in monitoring the state and/or operation of physical objects such as industrial machines, transport vehicles, and/or other Internet-of-Things (IoT) devices may operate a data platform that is configured to ingest, process, analyze, generate, store, and/or output data related to those physical objects of interest. As another example, a provider of a Software-as-a-Service (SaaS) application (e.g., a social media application) may operate a data platform that is configured to ingest, process, analyze, generate, store, and/or output data that is created in connection with that SaaS application. Many other examples are possible as well.

To illustrate with an example, FIG. 1 depicts a network environment 100 that includes at its core an example computing platform 102 that serves as a data platform for an organization, which may comprise a collection of functional subsystems that are each configured to perform certain functions in order to facilitate tasks such as data ingestion, data generation, data processing, data analytics, data storage, and/or data output. These functional subsystems may take various forms.

For instance, as shown in FIG. 1, the example computing platform 102 may comprise an ingestion subsystem 102a that is generally configured to ingest source data from a particular set of data sources 104, such as the three representative data sources 104a, 104b, and 104c shown in FIG. 1, over respective communication paths. These data sources 104 may take any of various forms, which may depend at least in part on the type of organization operating the example computing platform 102. For example, if the example computing platform 102 comprises a data platform operated by a financial institution, the data sources 104 may comprise computing devices and/or systems that generate and output data related to the financial institution's customers and their financial accounts, such as financial transactions data (e.g., purchase and/or sales data, payments data, etc.), customer identification data (e.g., name, address, social security number, etc.), customer interaction data (e.g., web-based interactions with the financial institution such as logins, as well as call logs, chat logs, and/or complaints), and/or credit history data, among various other possibilities. In this respect, the data sources that generate and output such data may take the form of payment processors, merchant service provider systems such as payment gateways, point-of-sale (POS) terminals, automated teller machines (ATMs), computing systems at brick-and-mortar branches of the financial institution, and/or client devices of customers (e.g., personal computers, mobile phones, tablets, etc.), among various other possibilities. The data sources 104 may take various other forms as well.

Further, as shown in FIG. 1, the example computing platform 102 may comprise one or more source data subsystems 102b that are configured to internally generate and output source data that is consumed by the example computing platform 102. These source data subsystems 102b may take any of various forms, which may depend at least in part on the type of organization operating the example computing platform 102. For example, if the example computing platform 102 comprises a data platform operated by a financial institution, the one or more source data subsystems 102b may comprise functional subsystems that internally generate and output certain types of data related to customer accounts (e.g., account balance data, payment schedule data, etc.). The one or more source data subsystems 102b may take various other forms as well.

Further yet, as shown in FIG. 1, the example computing platform 102 may comprise a data processing subsystem 102c that is configured to carry out certain types of processing operations on the source data. These processing operations could take any of various forms, including but not limited to data preparation, transformation, and/or integration operations such as validation, cleansing, deduplication, filtering, aggregation, summarization, enrichment, restructuring, reformatting, translation, mapping, etc.

Still further, as shown in FIG. 1, the example computing platform 102 may comprise a data analytics subsystem 102d that is configured to carry out certain types of data analytics operations based on the processed data in order to derive insights, which may depend at least in part on the type of organization operating the example computing platform 102. For example, if the example computing platform 102 comprises a data platform operated by a financial institution, the data analytics subsystem 102d may be configured to carry out data analytics operations in order to derive certain types of insights that are relevant to the financial institution's business, examples of which could include predictions of fraud, money laundering, or other suspicious activity on a customer's account, and/or predictions of whether to extend credit to an existing or prospective customer, among other possibilities. The data analytics subsystem 102d may be configured to carry out any of numerous other types of data analytics operations as well.

Moreover, the data analytics operations carried out by the data analytics subsystem 102d may be embodied in any of various forms. As one possibility, a data analytics operation may be embodied in the form of a user-defined rule (or set of rules) that is applied to a particular subset of the processed data in order to derive insights from that processed data. As another possibility, a data analytics operation may be embodied in the form of a data science model that is applied to a particular subset of the processed data in order to derive insights from that processed data. In practice, such a data science model may comprise a machine learning model that has been created by applying one or more machine learning techniques to a set of training data, but data science models for performing data analytics operations could take other forms and be created in other manners as well. The data analytics operations carried out by the data analytics subsystem 102d may be embodied in other forms as well.

Referring again to FIG. 1, the example computing platform 102 may also comprise a data output subsystem 102e that is configured to output data (e.g., processed data and/or derived insights) to certain consumer systems 106 over respective communication paths. These consumer systems 106 may take any of various forms.

For instance, as one possibility, the data output subsystem 102e may be configured to output certain data to client devices that are running software applications for accessing and interacting with the example computing platform 102, such as the two representative client devices 106a and 106b shown in FIG. 1, each of which may take the form of a desktop computer, a laptop, a netbook, a tablet, a smartphone, or a personal digital assistant (PDA), among other possibilities. These client devices may be associated with any of various different types of users, examples of which may include individuals that work for or with the organization operating the example computing platform 102 (e.g., employees, contractors, etc.) and/or customers of the organization operating the example computing platform 102. Further, the software applications for accessing and interacting with the example computing platform 102 that run on these client devices may take any of various forms, which may depend at least in part on the type of user and the type of organization operating the example computing platform 102. As another possibility, the data output subsystem 102e may also be configured to output certain data to other third-party data platforms, such as the representative third-party data platform 106c shown in FIG. 1.

In order to facilitate this functionality for outputting data to the consumer systems 106, the data output subsystem 102e may comprise one or more Application Programming Interface (APIs) that can be used to interact with and output certain data to the consumer systems 106 over a data network, and perhaps also an application service subsystem that is configured to drive the software applications running on the client devices, among other possibilities.

The data output subsystem 102e may be configured to output data to other types of consumer systems 106 as well.

Referring once more to FIG. 1, the example computing platform 102 may also comprise a data storage subsystem 102f that is configured to store all of the different data within the example computing platform 102, including but not limited to the source data, the processed data, and the derived insights. In practice, this data storage subsystem 102f may comprise several different data stores that are configured to store different categories of data. For instance, although not shown in FIG. 1, this data storage subsystem 102f may comprise one set of data stores for storing source data and another set of data stores for storing processed data and derived insights. However, the data storage subsystem 102f may be structured in various other manners as well. Further, the data stores within the data storage subsystem 102f could take any of various forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System or Amazon Elastic File System), object-based data stores (e.g., Amazon S3), data warehouses (which could be based on one or more of the foregoing types of data stores), data lakes (which could be based on one or more of the foregoing types of data stores), message queues, and/or streaming event queues, among other possibilities.

The example computing platform 102 may comprise various other functional subsystems and take various other forms as well.

In practice, the example computing platform 102 may generally comprise some set of physical computing resources (e.g., processors, data storage, etc.) that are utilized to implement the functional subsystems discussed herein. This set of physical computing resources take any of various forms. As one possibility, the computing platform 102 may comprise computing infrastructure of a public, private, and/or hybrid cloud (e.g., computing and/or storage clusters). In this respect, the organization that operates the example computing platform 102 may either supply its own cloud infrastructure or may obtain the cloud infrastructure from a third-party provider of "on demand" cloud computing resources, such as Amazon Web Services (AWS), Amazon Lambda, Google Cloud Platform (GCP), Microsoft Azure, or the like. As another possibility, the example computing platform 102 may comprise one or more servers that are owned and operated by the organization that operates the example computing platform 102. Other implementations of the example computing platform 102 are possible as well.

Further, in practice, the functional subsystems of the example computing platform 102 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

As noted above, the example computing platform 102 may be configured to interact with the data sources 104 and consumer systems 106 over respective communication paths. Each of these communication paths may generally comprise one or more data networks and/or data links, which may take any of various forms. For instance, each respective communication path with the example computing platform 102 may include any one or more of point-to-point data links, Personal Area Networks (PANs), Local Area Networks (LANs), Wide Area Networks (WANs) such as the Internet or cellular networks, and/or cloud networks, among other possibilities. Further, the data networks and/or links that make up each respective communication path may be wireless, wired, or some combination thereof, and may carry data according to any of various different communication protocols. Although not shown, the respective communication paths may also include one or more intermediate systems, examples of which may include a data aggregation system and host server, among other possibilities. Many other configurations are also possible.

It should be understood that the network environment 100 is one example of a network environment in which a data platform may be operated, and that numerous other examples of network environments, data platforms, data sources, and consumer systems are possible as well.

II. Data Represented in Graph Form

In data science, certain datasets can be encoded in the form of a data graph. A data graph is a representation of data that includes a collection of nodes (also known as vertices) and edges (also known as links). In general, nodes may represent any of various kinds of data entities, and edges may represent any of various kinds of relationships, connections, and/or interactions between these entities. Additionally, a data graph may also include types and/or attributes for the nodes, the edges, or both.

Examples of datasets that may be suited for encoding in graph form might include (i) social network data, which could be modeled as a graph with each node representing an individual person and each edge representing a relationships between two people, (ii) biological networks, such as a protein-protein interaction network that could be modeled as a graph with each node representing a protein and each edge representing an interaction between two proteins, (iii) transportation networks, such as a subway system that could be modeled as a graph with each node representing a subway station and each edge representing a railway connecting two stations, or (iv) financial data, such as customer-merchant transactions data that could be modeled as a graph with each node representing a customer or a merchant and each edge representing a transaction between one of the customers and one of the merchants.

Data graphs are useful for data scientists because they can be used to model and analyze complex relationships and dependencies in data. By representing data in the form of a graph, it can be easier to identify patterns and make predictions from the data than if the data is presented in tabular or other forms. For instance, some specific benefits of representing data in graph form can include: (i) providing a visual representation of data, which may allow for easier understanding of complex relationships and dependencies, (ii) modeling large and complex datasets, allowing data scientists to analyze and draw insights from large-scale data, (iii) analyzing the connectivity between entities in a dataset, allowing data scientists to identify important nodes or clusters in the graph, and (iv) building predictive models, allowing data scientists to make predictions about future data points based on the patterns and relationships identified in the graph.

While data graphs can be beneficial in the various ways described above, the use of data graphs may present various challenges by introducing complexity into a data platform. Indeed, in order to leverage the functionality of data graphs, a data platform may need to be configured with technology for building and analyzing the graphs, which can include data integration technology for preparing data for use in a data graph, graph construction technology for building data graphs, technology for training and executing machine learning models for analyzing data graphs, and technology for visualizing the data graphs and/or the results of their analyses.

Further, while at least some technology currently exists for building and analyzing data graphs, there remains a need for technology that enables an organization to build and analyze data graphs in a more efficient, seamless, and/or user-friendly manner.

To address these and other limitations, disclosed herein is software technology that improves the process of constructing and analyzing data graphs. One aspect of the disclosed software technology comprises functionality that enables data scientists and other professionals to configure and deploy a "graph analysis pipeline" that comprises functionality for constructing a graph from an input dataset and then performing certain tasks to facilitate analysis of the graph, such as tasks that facilitate building and/or executing a "graph data science model" that is configured to render predictions based on a graph. Another aspect of the disclosed software technology comprises functionality for evaluating graphs, features, and/or graph data science models that have been produced by a graph analysis pipeline. The disclosed software technology may comprise various other functionality that helps facilitate the task of constructing and analyzing data graphs as well, which is described in further detail below.

In practice, the disclosed software technology may be implemented in the form of a new functional subsystem for configuring and deploying graph analysis pipelines, which could be installed on any computing platform that is capable of processing data represented in the form of a graph, one example of which may be the computing platform 102 described above. Further, in practice, the new functional subsystem may have a network-accessible interface such as an API that facilitates interaction with users such as data scientists during tasks such as configuring a graph analysis pipeline or evaluating the output of a graph analysis pipeline (e.g., a graph, a set of features, or a graph data science model that is produced by a graph analysis pipeline), among other possibilities. In this respect, the different functionalities of the new functional subsystem that are exposed to users via the API may also be referred to herein as a "toolkit" or "toolbox" for configuring, deploying, and evaluating graph analysis pipelines.

III. Example Subsystem for Configuring, Deploying, and Evaluating Graph Analysis Pipelines FIG. 2 depicts an example architecture of a new functional subsystem 200 for configuring, deploying, and evaluating graph analysis pipelines, which may itself comprise a collection of functional subsystems that are each configured to perform a certain set of functionality related to a graph analysis pipeline.

Figure 2:
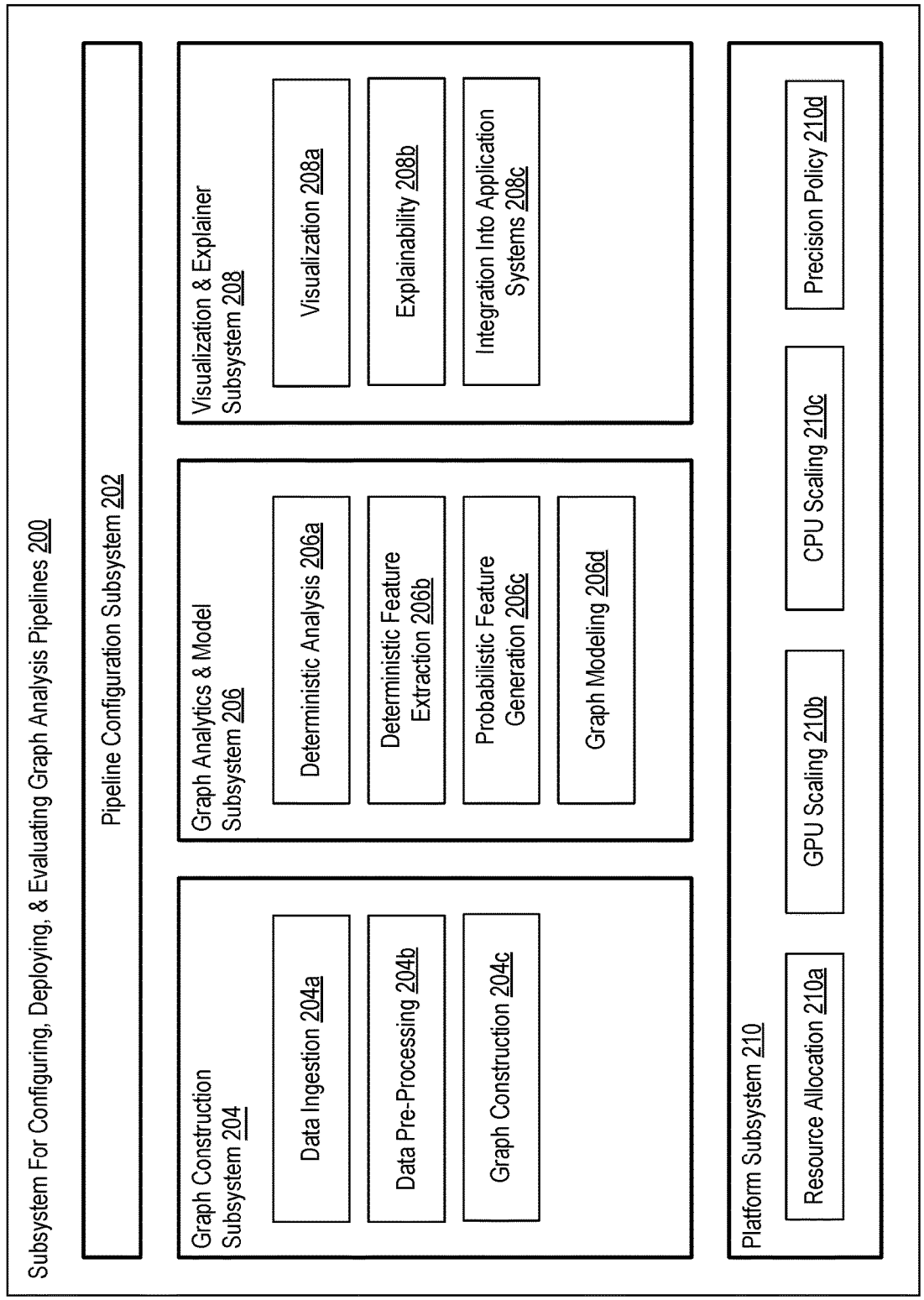
FIG. 2 depicts an example architecture of a functional subsystem for configuring, deploying, and evaluating graph analysis pipelines according to aspects of the disclosed technology.

For instance, as shown in FIG. 2, the example subsystem 200 may include five functional subsystems-(i) a pipeline configuration subsystem 202, (ii) a graph construction subsystem 204, (iii) a graph analytics and model subsystem 206, (iv) a visualization and explainer subsystem 208, and (v) a platform subsystem 210. Each of these functional subsystems will now be described in further detail.

At times below, the example subsystem 200 may be described in the context of constructing graphs comprising financial data that may be available to a financial institution and building and/or executing graph data science models for analyzing such graphs, but it should be understood that (i) the example subsystem 200 may be used to analyze graphs comprising other types of data found in other industries as well and (ii) the example subsystem 200 may be used to facilitate other tasks related to analyzing graphs beyond building and/or executing graph data science models.

a. Pipeline Configuration Subsystem

At a high level, the pipeline configuration subsystem 202 may be configured to (i) provide a network-accessible interface such as an API through which a data scientist or other user may provide configuration information that defines various parameters for configuring a graph analysis pipeline and (ii) configure a new graph analysis pipeline for deployment based on configuration information that is provided through the API This configuration information may take various forms.

As one possibility, the configuration information that is provided to and received by the pipeline configuration subsystem 202 may include configuration information specifying an input dataset for the pipeline, such as configuration data defining one or more data sources from which the input dataset is to be obtained (e.g., internal data stores containing raw or pre-processed data, external data sources that are accessible via APIs, etc.). In this respect, the form of the input data that is to be obtained may depend in part on the use case for which the data analysis pipeline is being configured.

For instance, in the context of a graph analysis pipeline configured by a financial institution, the input dataset may include data related to the financial institution's customers and their financial accounts, such as financial transactions data (e.g., purchase and/or sales data, payments data, etc.), customer identification data (e.g., name, address, social security number, etc.), merchant identification data (e.g., name, address, business type, etc.), customer interaction data (e.g., web-based interactions with the financial institution such as logins, as well as call logs, chat logs, and/or complaints), and/or credit history data, among other possibilities.

As another possibility, the configuration information that is provided to and received by the pipeline configuration subsystem 202 may include configuration information specifying parameters for constructing one or more graphs based on the input dataset, such as configuration data defining the types of nodes to include in a graph, the types of edges to include in a graph (e.g., the types of relationships between the nodes that are to be encoded within the graph), and/or the set of attributes to encode within the graph for the nodes and/or edges, among other possibilities. In this respect, the form of the graph that is to be constructed may depend in part on the use case for which the data analysis pipeline is being configured, and may take the form of either be a homogenous graph in which all nodes are of the same or a heterogenous graph in which the nodes are of different types.

For instance, in the context of a graph analysis pipeline configured by a financial institution, the graph to be constructed may comprise nodes that represent any one or more of (i) the financial institution's customers, (ii) transactions involving the financial institution's customers, (iii) merchants involved transactions involving the financial institution's customers, and/or (iv) devices involved in transactions involving the financial institution's customers such as ATMs, POS devices, or the like, among various other possible types of nodes.

Further, in the context of a graph analysis pipeline configured by a financial institution, the graph to be constructed may comprise edges that represent transfers of funds between entities represented by the nodes. For example, if the configuration information specifies a homogeneous graph that includes only customer nodes, an edge between one customer node and another customer node may represent a peer-to-peer transaction between the customers corresponding to the two nodes. As another example, if the configuration information specifies a heterogeneous graph that includes customer nodes, merchant nodes, and transaction nodes, a transaction node representing a particular transaction may be connected via edges to both a customer node and a merchant node in order to represent the transfer of funds that occurred during the particular transaction between the customer corresponding to the customer node and the merchant corresponding to the merchant node.

Further yet, in the context of a graph analysis pipeline configured by a financial institution, the graph to be constructed may be configured to include a first set of attributes for customer nodes (e.g., name, address, social security number, credit score, purchase history, demographics, etc.), a second set of attributes for merchant nodes (e.g., name, address, business type, etc.), a third set of attributes for transaction nodes (e.g., amount, date, time, location, etc.), and so on for each type of node to be included within the graph.

However, these examples are merely illustrative, and the configuration data may define graphs of various other forms as well.

As yet another possibility, the configuration information that is provided to and received by the pipeline configuration subsystem 202 may include configuration information identifying the analytics and/or modeling tasks that are to be performed based on the graph and specifying parameters related to such analytics and/or modeling tasks. In this respect, the type of analytics and/or modeling tasks that are configured may depend in part on the use case for which the data analysis pipeline is being configured.

In accordance with the present disclosure, the configuration information identifying the analytics and/or modeling tasks that are to be performed based on the graph may include configuration information identifying any one or more of a deterministic analysis task, a deterministic feature extraction task, a probabilistic feature generation task, a model training task, and/or a model execution task, among various other possibilities. And in turn, the configuration information specifying parameters for these analytics and/or modeling tasks may take various forms.

For example, if a deterministic analysis task is identified, the configuration information may further define the particular deterministic analysis task that is to be performed, such as by specifying that the deterministic analysis task is to involve a determination of the number of nodes and/or edges in the graph, a degree or valency of any or all of the nodes in the graph, or some other deterministic technique for characterizing the graph.

As another example, if a deterministic feature extraction task is identified, the configuration information may further define the particular deterministic feature extraction task that is to be performed, such as by specifying that the deterministic feature extraction task is to involve a determination of the centrality of the nodes in the graph (e.g., closeness centrality, betweenness centrality, or eigenvector centrality) and perhaps also application of a weight factor to any or all of a given node's attributes based on its determined centrality, such that the weighted attributes can be used as input features for a graph data science model.

As yet another example, if a probabilistic feature generation task is identified, the configuration information may further define the particular probabilistic feature generation task that is to be performed, such as by specifying one or more techniques to utilize for generating embedding vectors for the nodes of the graph (e.g., a shallow embedding technique, a deep embedding technique, etc.) and perhaps also defining applicable configuration parameters for specified technique(s) for generating embedding vectors.

As still another example, if a model training task is identified, the configuration information may further define the particular model training task that is to be performed, such as by specifying the type of prediction that is to be made by the graph data science model, the type of graph data science model to be trained, the one or more machine learning techniques that are to be used to train the graph data science model, the training dataset that is to be used to train the graph data science model, and/or the hyperparameters that are to be used for the training, among other possibilities. In this respect, the one or more machine learning techniques to are to be applied to the training data in order to train the graph data science model may take any of various forms, examples of which may include a neural network technique (which is sometimes referred to as "deep learning"), a regression technique, a k-Nearest Neighbor (kNN) technique, a decision-tree technique, a support vector machines (SVM) technique, a Bayesian technique, an ensemble technique, a clustering technique, an association-rule-learning technique, a dimensionality reduction technique, an optimization technique such as gradient descent, a regularization technique, and/or a reinforcement technique, among other possible types of machine learning techniques. Further, the training data that is to be used to train the graph data science model may take the form of feature data for certain nodes and/or edges that is derived from a graph (e.g., data for certain deterministic and/or probabilistic features derived from the graph and/or attributes data) and perhaps also corresponding labels indicating desired predictions of the graph data science model for the nodes and/or edges (which is sometimes referred to as "ground truth" data). For instance, if the purpose of the graph data science model is to predict whether a given transaction is fraudulent, then the training data may include labels for the transaction nodes within the graph indicating whether or not the transaction nodes represent fraudulent transactions. However, the type of prediction that is to be made by the graph data science model, and thus the form of the training data, may take many other forms as well.

As a further example, if a model execution task is identified, the configuration information may further define the particular model execution task that is to be performed, such as by specifying the particular graph data science model that is to be executed as part of the pipeline.

In practice, the pipeline configuration subsystem 202 may receive such configuration information in the form of configuration data that is provided to the pipeline configuration subsystem 202 through the API. Such configuration data may take various forms. As one example, such configuration data may comprise a set of structured data (e.g., a JSON file) that is passed into the API from a user's client station. As another example, such configuration data may comprise one or more configuration files containing code that, when executed by the pipeline configuration subsystem 202, cause the pipeline configuration subsystem 202 to operate in accordance with instructions in the configuration file. In this respect, the configuration file itself may be passed into the API from a user's client station, or alternatively, an identifier of a storage location of a configuration file may be passed into the API from a user's client station and the pipeline configuration subsystem 202 may then retrieve the one or more configuration files from the storage location and cause the example subsystem 200 to execute the configuration instructions in the one or more configuration files. As yet another example, the configuration subsystem 202 may receive the configuration data by way of one or more user inputs, such as via selections of configuration parameters in prepopulated dropdown menus or the like. The pipeline configuration subsystem 202 may receive configuration information in various other forms as well.

Based on the configuration information received by the pipeline configuration subsystem 202, the example subsystem 200 may deploy a graph analysis pipeline for constructing a graph from an input dataset and performing any of various analytics and/or modeling tasks based on the graph in order to facilitate an analysis of the graph. In this way, the disclosed technology may advantageously enable data scientists or other professionals to configure and deploy graph analysis pipelines in a quicker and more efficient way because certain aspects of the process for configuring and deploying such a graph analysis pipeline are automated and there is less user input required than in existing software applications for building and analyzing data graphs.

The pipeline configuration subsystem 202 may perform various other functions as well.

b. Graph Construction Subsystem

At a high level, the graph construction subsystem 204 may be configured to perform the functions of a graph analysis pipeline that are related to obtaining an input dataset and then constructing one or more graphs based on that input dataset. The graph construction subsystem 204 may accomplish these tasks in various ways, and in some examples, the graph construction subsystem 204 may include one or more sub-components for performing these tasks.

For instance, as shown in FIG. 2, the graph model construction subsystem 204 may include one or more of (i) a data ingestion component 204a configured to ingest an input dataset for a graph analysis pipeline from one or more data sources (e.g., data records in raw and/or pre-processed form, perhaps including data records that have previously been constructed into a graph form), (ii) a data pre-processing component 204b configured to perform various data processing operations on the input dataset to prepare the input dataset for representation as part of a graph, and (iii) a graph construction component 204c configured to use the input dataset to construct a data graph comprising a set of nodes interconnected by edges.

In accordance with the present disclosure, the particular form of the input dataset that is ingested by the data ingestion component 204a and the particular form of the graph that is constructed by the graph construction component 204c may depend on the use case for which the graph data science model is being built. For example, if a graph data science model is being built for purposes of detecting fraudulent financial transactions, the input dataset may comprise data records from a first set of data sources related to financial transactions (e.g., transaction data, customer data, merchant data, etc.) and a graph having a first form may be constructed (e.g., a graph comprising nodes for transactions and perhaps also for customers and/or merchants), whereas if a graph data science model is being built for purposes of making predictions related to a marketing use case, the input dataset may comprise data records from a second set of data sources related to that marketing use case and a graph having a second form may be constructed, among various other possible examples.

Further, the graph that is constructed by the graph construction component 204c could either be a homogenous graph in which all nodes are of the same type (e.g., all nodes represent customers or all nodes represent transactions) or a heterogenous graph in which the nodes are of different types (e.g., nodes representing two or more of customers, transactions, merchants, etc.).

Further yet, in the graph that is constructed by the graph construction component 204c, the nodes may each comprise any of various different attributes that are associated with the entity represented by the node, and in a scenario where the graph is heterogenous, each type of node may comprise a different set of attributes. For example, if the graph construction component 204c is configured to construct a heterogenous graph comprising customer nodes, transaction nodes, and merchant nodes, the graph construction component 204c may encode a first set of attributes for the customer nodes, a second set of attributes for the transaction nodes, and a third set of attributes for the merchant nodes, among many other possible examples.

Still further, in practice, the particular form of the graph that is constructed by the graph construction component 204c in accordance with a graph analysis pipeline—and the corresponding techniques employed by the graph construction component 204c in order to construct a graph of that particular form-either may be defined based on the configuration information that is provided to the pipeline configuration subsystem 202 during the process of configuring graph analysis pipeline (e.g., configuration information that defines types of nodes and edges that are to be encoded in the graph, the attributes that are to be encoded for the nodes and edges, etc.) or may be determined by the graph construction component 204c based on an analysis of the input dataset, among other possibilities.

Figure 3:
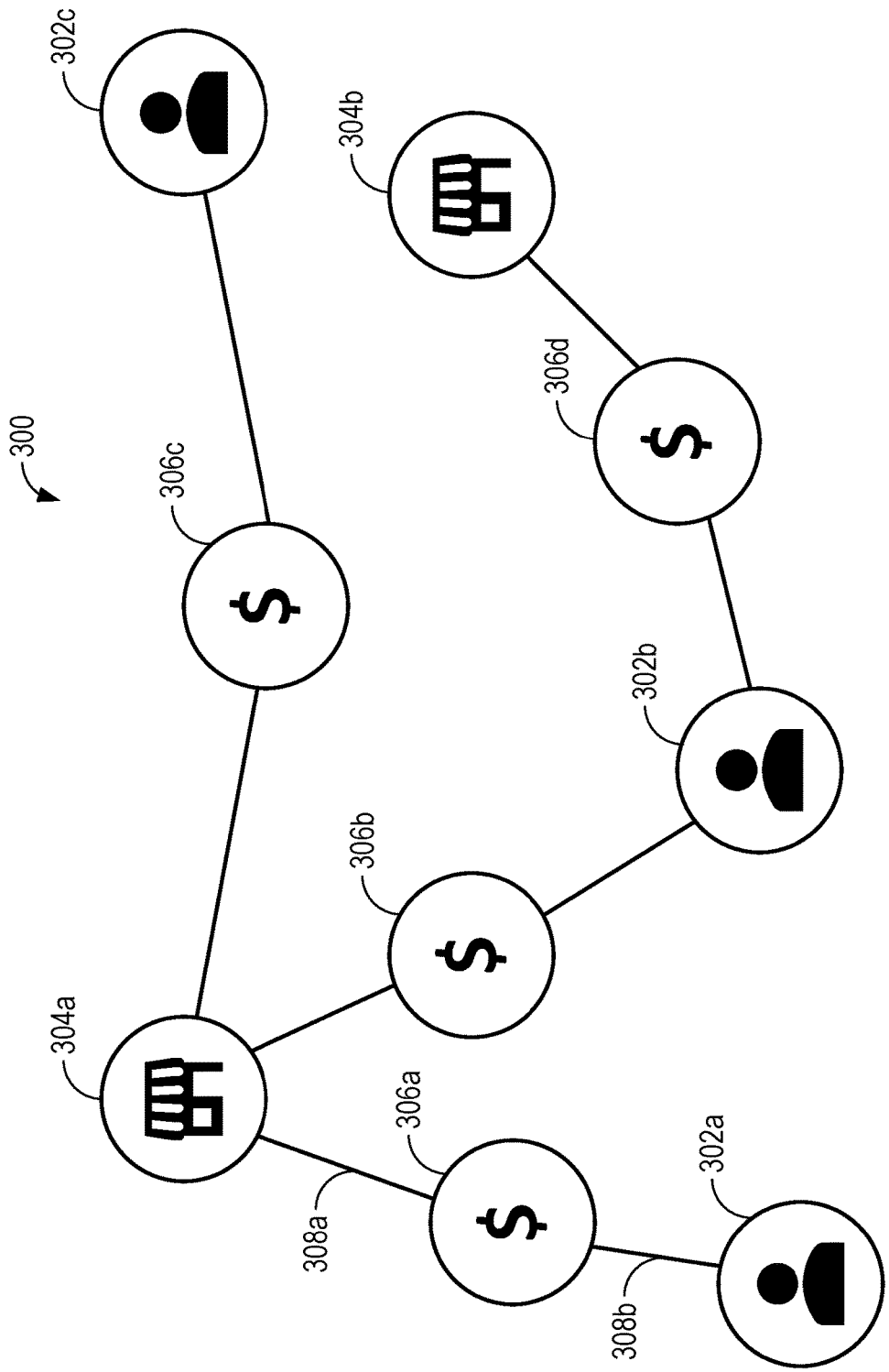
FIG. 3 depicts a visual representation of one portion of an example graph that may be built according to aspects of the disclosed technology.

FIG. 3 depicts a visual representation of one portion of an example graph 300 that the graph construction component 204c may build based on an input dataset and associated configuration data, where the example graph 300 may be utilized for a financial use case such as detection of suspicious or fraudulent activity. It should be understood that the portion of the example graph 300 depicted in FIG. 3 is a simplified version of a graph shown for illustrative purposes only and that, in practice, a graph built by the graph construction component 204c may significantly differ in size, complexity, or form.

In order to produce the example graph 300 depicted in FIG. 3, the configuration information received by the pipeline configuration subsystem 202 may specify the node types of the graph 300 to include customer nodes 302 corresponding to respective customers of a financial institution, merchant nodes 304 corresponding to merchants with whom the customers have transacted, and transaction nodes 306 corresponding to transactions between the customers and merchants. The configuration data further specifies that each transaction node 306 is connected by respective edges 308 to the particular customer node 302 and merchant node 306 corresponding to the particular customer and merchant involved in the transaction. Thus, in the present example, because the input dataset includes data defining a first transaction (corresponding to transaction node 306a) between a first customer (corresponding to customer node 302a) and a first merchant (corresponding to merchant node 304a) the graph construction component 204c creates edge 308a to connect transaction node 306a to merchant node 304a and creates edge 308b to connect transaction node 306a to customer node 302a. The graph construction component 204c follows a similar process to build out the rest of the nodes and edges of the graph 300.

Further, when building the graph 300, the graph construction component 204c may encode a respective set of attributes for each node within the graph 300. Each set of attributes may take the form of a one-dimensional vector comprising a respective data value for each attribute, however other forms are possible as well. In line with the discussion above, the configuration information may specify which attributes to encode for a given node, such as by identifying one or more data variables in the input dataset. As such, the graph construction component 204c may determine the set of attributes for a given node using the data in the input dataset that corresponds to the data variables identified by the configuration data.

In some implementations, when using the data in the input dataset to determine the attributes for each node in the graph 300, the data pre-processing component 204b may apply one or more data transformations to the data before including the data in the set of attributes for a given node. Examples of such data transformations may include one or more encoding operations, such as an encoding operation for scaling with a range defined by min and max values, standardizing values by subtracting mean and dividing by standard deviation, a log and quantile/decile transformation, a one-hot encoding operation, an encoding operation for numerical transformation, or an algorithm-specific encoding operation (e.g., for CatBoost, sklearn, or category_encoder python packages). Other example data transformations may include (i) a data aggregation operation that aggregates values of an input data variable over time, (ii) a data sampling operation that samples the values of an input data variable over time, (iii) a re-ordering operation that rearranges the order of values for an input data variable (either across multiple input data records or within a single input data record if that input data record contains multiple values for the input data variable), and/or (iv) a missing value operation that replaces missing or unusable values for an input data variable with usable values, among various other possibilities. The particular data transformations applied may be predefined transformations or may be specified by the configuration data and may be defined based on business or domain knowledge.

The graph construction subsystem 204 may include various other sub-components and perform various other functions as well.

c. Graph Analytics and Model Subsystem

At a high level, the graph analytics and model subsystem 206 may be configured to perform certain analytics and/or modeling tasks based on a graph as part of a graph analysis pipeline, examples of which may include a deterministic analysis task, a deterministic feature extraction task, a probabilistic feature generation task, a model training task, and/or a model execution task, among various other possibilities.

The graph analytics and model subsystem 206 may accomplish these tasks in various ways, and in some examples, the model subsystem 206 may include one or more sub-components for performing these tasks. For instance, as shown in FIG. 2, the graph analytics and model subsystem 206 may include one or more of (i) a deterministic analysis component 206a, (ii) a deterministic feature extraction component 206b, (iii) a probabilistic feature generation component 206c, and (iv) a graph modeling component 206d.

The deterministic analysis component 206a may be configured to perform one or more deterministic analyses for characterizing a graph that is built by the graph model construction subsystem 204. Examples of such deterministic analyses may include a determination of the number of nodes and/or edges in the graph, a degree or valency of any or all of the nodes in the graph, or any other deterministic technique for characterizing the graph.

The output of the deterministic analysis component 206a may then be utilized for various purposes, examples of which may include serving as an input of a downstream process for generating features, serving as an input of a downstream process for building a graph data science model, and/or serving as an input to the visualization and explainer subsystem 208.

The deterministic feature extraction component 206b may be configured to perform one or more deterministic analyses for extracting feature data from a graph that is built by the graph construction subsystem 204 For instance, the deterministic feature extraction component 206b may be configured to determine the centrality of any or all of the nodes within a graph, such as by determining a node's closeness centrality, betweenness centrality, or eigenvector centrality, which may provide an indication of the "importance" of the nodes within the graph. Additionally, the deterministic feature extraction component 206b may optionally be configured to apply a weight factor to any or all of a given node's attributes that is based on the given node's determined centrality. The deterministic feature extraction component 206b may be configured to perform other types of deterministic analyses as well.

The output of the deterministic feature extraction component 206b may then be utilized for various purposes, examples of which may include serving as an input of a downstream process for building a graph data science model (e.g., as training data for a machine learning process), serving as an input of a downstream process for executing a graph data science model, and/or serving as an input to the visualization and explainer subsystem 208.

The probabilistic feature generation component 206c may be configured to perform one or more probabilistic analyses for generating feature data from a graph that is built by the graph construction subsystem 204. For instance, the probabilistic feature generation component 206c may be configured to generate embedding vectors for some or all nodes within a graph, which are low-dimensional vectors (relative to the dimension of the graph space) that each summarizes a given node's position in the graph and/or the structure of its local neighborhood of nodes in the graph. The probabilistic feature generation component 206c may be configured to use any of various techniques to generate such embedding vectors, examples of which may include (i) shallow embedding techniques, such as a random walk algorithm (e.g., node2vec or DeepWalk) or a matrix factorization algorithm (e.g., Laplacian eigenmaps, Graph Factorization, GraRep, or HOPE), which typically do not use the attributes of the nodes within the graph and/or (ii) deep embedding techniques, such as the GraphSAGE algorithm, column networks approaches, or graph convolutional networks (GCN) approaches, which typically do use the attributes of the nodes within the graph. In this respect, the logic that is executed by the probabilistic feature generation component 206c in order to generate embedding vectors may be referred as an "encoder," where an encoder that generates embedding vectors based on a shallow embedding technique may be referred to as a "shallow encoder" and an encoder that generates embedding vectors based on a deep embedding technique may be referred to as a "deep encoder."

In practice, shallow embedding techniques are inherently transductive and deep embedding techniques are inherently inductive, although the probabilistic feature generation component 206c may also be configured to use shallow embedding techniques that are capable of constructing shallow encoders having inductive properties. For instance, an inductive shallow embedding technique may utilize the embeddings for the training nodes and/or edges along with a measure of the similarity of the unseen nodes and/or edges in the test data with training nodes and/or edges to compute approximate embeddings for the unseen nodes and/or edges, such as by using some tailored pooling operations for the unseen nodes and/or edges based on the similarity measure under consideration. Examples of such inductive shallow embedding techniques may include inductive node2vec and inductive DeepWalk, among other possible examples. Shallow embedding techniques and deep embedding techniques tend to have certain defining characteristics that differ from one another and may provide certain advantages relative to one another, particularly with respect to factors such as scalability, inductivity, explainability, and/or handling imbalanced data.

For instance, shallow embedding techniques (e.g., DeepWalk) tend to be less scalable because they typically consume a greater extent of computational power and memory as the size of the training graph increases, whereas deep embedding techniques tend to be more scalable because they typically consume a lesser extent of computational power and memory, which is due to the fact that deep embedding techniques are based on sampling nodes and aggregating features from an individual node's local neighborhood rather than training on the entire graph using shallow encoders. In fact, when using deep embedding techniques, it is possible to only train on a part of the training graph and apply it to other parts of the graph that were not used for training.

Further, deep embedding techniques are inherently inductive as they only leverage information from the local computational graph, whereas shallow embedding techniques typically need to learn embeddings for each training node and/or edge in the training graph. In other words, shallow embedding techniques typically "memorize" the training nodes and/or edged as opposed to deep encoders where they learn how to aggregate information from a given computational graph determined locally.

Further yet, because deep embedding techniques leverage node/edge features along with the network structure to generate embeddings, it can be more difficult to distinguish and study what aspects of the learned embeddings originate from the network structure (and thus interactions between entities) and how the original features affect the resulted embeddings. Hence, it is often easier to design explanations for shallow embedding techniques compared to deep embedding techniques.

Still further, deep embedding techniques tend to be more sensitive to learning from highly imbalanced-ratio datasets, where an imbalanced ratio typically denotes the relative size of a minority class compared to a majority class. This is because deep embedding techniques typically only leverage a node's local neighborhood to compute embeddings, and in a highly imbalanced environment, there may only be a few nodes of the minority class that lie in the local computational graph, which means that the signal from the minority class may be outweighed by that of the majority class resulting in very low classification performance for the minority class. And while there may be ways to add more layers to deep embedding techniques so that they can search deeper in the graph for the minority nodes, this could lead to an over-smoothing problem. For example, when local computational graphs are so large that they have a lot of intersection, a deep embedding technique may aggregate almost the same information, and this may result in generated embeddings that are very similar, which may in turn lack sufficient distinguishing power between the majority and minority class. On the other hand, shallow embedding techniques offer more control over graph traversal approaches, as they can search deep into the graph and can balance between BFS (breadth-first search) and DFS (depth-first search), and as such shallow embedding techniques tend to be less susceptible to a decline in classification performance for highly imbalanced-ratio datasets.

In accordance with the present disclosure, the probabilistic feature generation component 206c either could be configured to generate a single type of embedding vector for each node of interest within a graph (e.g., embedding vectors generated using one particular shallow embedding or deep embedding technique) or could be configured to generate multiple different types of embedding vectors for each node of interest within a graph, such as a first type of embedding vector generated using a shallow embedding technique (e.g., as embodied in the form of a shallow encoder) and a second type of embedding vector generated using a deep embedding technique, among other possibilities (e.g., as embodied in the form of a deep encoder). In this respect, an embodiment in which the probabilistic feature generation component 206c is configured to generate multiple different types of embedding vectors for each node of interest within a graph may enable a graph analysis pipeline to leverage the relative advantages of multiple different types of embedding techniques and thereby improve over graph analysis pipelines that only utilize a single type of embedding technique.

Further, if the probabilistic feature generation component 206c is configured to generate embedding vectors using a shallow embedding technique, then depending on the size and complexity of the graph, the process of generating embedding vectors may involve (i) dividing the graph built by the graph construction component 204c into multiple smaller subgraphs (e.g., by splitting the graph across time and/or by using parameters defining a maximum number of nodes and/or edges within each subgraph), (ii) generating a respective set of embeddings for each of the smaller subgraphs, and then (iii) combining the respective sets of embeddings for the subgraphs into a single, combined set of embeddings for the full graph using any technique now known or later developed.

Further yet, in a scenario where the disclosed technology is utilized to generate two different types of embedding vectors using two different techniques, the probabilistic feature generation component 206c may also be configured (e.g., based on configuration information provided to the pipeline configuration subsystem 202) to combine each respective node's two embedding vectors in some manner. For instance, in such a scenario, the probabilistic feature generation component 206c may be configured to concatenate the two embedding vectors for each respective node together to create a single, concatenated embedding vector for the respective node (e.g., a vector comprising a collection of all feature variables that were included in the two individual embedding vectors), and may then either use the concatenated embedding vector for the node or may thereafter input the concatenated embedding vector for the node into a neural network (or the like) that produces a lower-dimension version of the concatenated embedding vector for the node. The probabilistic feature generation component 206c may also be configured to combine each respective node's two embedding vectors together in other manners as well. However, whether or not the probabilistic feature generation component 206c is configured to combine each respective node's two embedding vectors together into a single vector may ultimately depend on the particular graph analysis pipeline that has been deployed, and in at least some implementations, the probabilistic feature generation component 206c may be configured to output each respective node's individual embedding vectors without combining them together.

Still further, in scenario where the disclosed technology is utilized to generate two different types of embedding vectors using two different embedding techniques, the encoders used to generate the different types of embedding vectors could be re-trained at different frequencies. For instance, in a scenario where both a shallow encoder and a deep encoder are used, the probabilistic feature generation component 206c may be configured to re-train the shallow encoder less frequently than it re-trains the deep encoder given that the cost of re-training shallow encoders tends to be significantly higher than the cost of re-training deep encoders. In this respect, the respective frequencies at which the encoders are trained may be determined based on an analysis of cost and/or other factors. However, in other implementations, the probabilistic feature generation component 206c may be configured to re-train the encoders according to the same frequency.

The functions performed by the probabilistic feature generation component 206c may take various other forms as well.

The output of the probabilistic feature generation component 206c may then be utilized for various purposes, examples of which may include serving as an input of a downstream process for building a graph data science model (e.g., as training data for a machine learning process), serving as an input of a downstream process for executing a graph data science model, and/or serving as an input to the visualization and explainer subsystem 208.

The graph modeling component 206d may be configured to train a graph data science model for outputting predictions based on a graph that is built by the graph construction subsystem 204. For instance, the graph modeling component 206d may be configured to apply one or more machine learning techniques to a training dataset that is generated based on a graph in order to train a graph data science model for outputting predictions based on the graph (or other graphs having a comparable form). In this respect, the one or more machine learning techniques that are utilized by the graph modeling component 206d may take various forms, examples of which may include a neural network technique, a regression technique, a kNN technique, a decision-tree technique, a SVM technique, a Bayesian technique, an ensemble technique, a clustering technique, an associationrule-learning technique, a dimensionality reduction technique, an optimization technique such as gradient descent, a regularization technique, and/or a reinforcement technique, among other possible types of machine learning techniques. Further, the training data that is to be used to train the graph data science model may take the form of feature data for certain nodes and/or edges within a graph, such as data for certain deterministic and/or probabilistic features that are derived for the nodes and/or edges and perhaps also attribute data for such nodes and/or edges, along with corresponding labels indicating desired predictions of the graph data science model for the nodes and/or edges (which is sometimes referred to as "ground truth" data).

The graph modeling component 206d may be configured to train a graph data science model for outputting any of various types of predictions, which may depend on the use case. To illustrate with an example, a financial institution may utilize the disclosed technology train a graph data science model to output any of various types of predictions related to the financial institution's business, which may include a prediction of whether a transaction is a fraudulent transaction, a prediction of whether a customer or merchant is engaged in money laundering activities, or a prediction of whether a customer committed fraud on a credit card application, among various other possibilities.

Further, in accordance with the present disclosure, the graph modeling component 206d may be configured to train multiple intermediate graph data science models that are then combined together into a single, combined graph data science model. For instance, in a scenario where the disclosed technology is utilized to generate two different types of embedding vectors using two different techniques, the graph modeling component 206d may be configured to train a first intermediate graph data science model for outputting a given type of prediction based on the first type of embedding vectors and a second intermediate graph data science model for outputting the same given type of prediction based on the second type of embedding vectors, where the first and second intermediate graph data science models are combined together into a single, combined graph data science model having an output that comprises a weighted, linear combination of the outputs of the first and second intermediate graph data science models (among other possible ways in which two intermediate models may be combined together to produce a single, combined model). In this respect, the configuration information that is provided to the pipeline configuration subsystem 202 may include configuration information for such a combined model-including both configuration information for each of the intermediate models and configuration information for how to combine the intermediate models into the combined model. Moreover, in practice, the intermediate models could be re-trained at different frequencies. For instance, an intermediate model based on embeddings generated using a shallow encoder may be re-trained less frequently than an intermediate model based on embeddings generated using a deep encoder given that the cost of re-training shallow encoders tends to be significantly higher than the cost of re-training deep encoders. The graph modeling component 206d may also be configured to run a graph data science model for outputting predictions based on a graph that is built by the graph construction subsystem 204. For instance, the disclosed technology may enable a user to configure a graph analysis pipeline for executing a graph data science model that was previously trained by the graph modeling component 206d (or some other system), where such a graph analysis pipeline may involve functions of constructing a graph, deriving features based on the constructed graph, and then inputting the derived features (and perhaps also attribute data for nodes and/or edges of the graph) into a graph data science model that functions to render a given type of prediction related to a node and/or edge of the graph, and when such a graph analysis pipeline is deployed, the graph modeling component 206d may function to run the graph data science model—although it should be understood that a graph data science model within a graph analysis pipeline may be run by other subsystems of a computing platform as well.

The functions performed by the graph modeling component 206d may take various other forms as well.

The graph analytics and model subsystem 206 may include various other sub-components and perform various other functions as well.

d. Visualization & Explainer Subsystem

At a high level, the visualization and explainer subsystem 208 may be configured to perform functions related to evaluating outputs of a graph analysis pipeline, such as a graph, a set of features, or a graph data science model produced by a graph analysis pipeline. The visualization and explainer subsystem 208 may accomplish these tasks in various ways, and in some examples, the visualization and explainer subsystem 208 may include one or more sub-components for performing such functions. For instance, as shown in FIG. 2, the visualization and explainer subsystem 208 may include one or more of (i) a visualization component 208a, (ii) an explainability component 208b, and (iii) an integration into application systems component 208c.

The visualization component 208a may be configured to generate, for display to a user, a visual representation of at least a portion of a graph that has been constructed by a graph analysis pipeline, where such a visual representation may then be used for various purposes-including as a basis for aiding the task of building and/or updating a graph data science model. Along with presenting a graph, the visualization component 208a may also be configured to present other data related to a graph as well, such as deterministic and/or probabilistic features derived based on the graph, predictions rendered by a graph data science model based on the graph (e.g., predictions that certain nodes give rise to issues such as suspicious activity, fraud, etc.), and/or explainer data.

Further, in some implementations, the visualization component 208a may cause the visual representation of the graph to be displayed in a manner that allows for user interaction with the model. For instance, in response to receiving a user selection of a node or edge in the displayed representation, the visualization component 208a may update the displayed representation to present information about the selected node or edge, such as information about a selected node's attributes. Further, in response to receiving a command to delete a selected node or edge, the visualization component 208a may cause the subsystem 200 to re-run the graph analysis pipeline with respect to the updated graph. In this manner, a user may manipulate the graph in real time to observe the impact that different nodes and/or edges may have on the analysis of the graph.

The explainability component 208b may be configured to determine and output (i) explainer data for embedding vectors produced by the probabilistic feature generation component 206c (e.g., data indicating what each dimension of the learned embedding vector represents), (ii) explainer data for predictions produced by a graph data science model that is trained by the graph modeling component 206d (e.g., data indicating a particular subset of nodes, edges, and/or features that were most impactful to a prediction), or both.

The explainability component 208b may determine explainer data for embedding vectors and/or model predictions using any of various explainer techniques, examples of which may include methods based on reinforcement learning (e.g., a method that trains a graph generator from a subgraph), methods based on perturbations of an input graph that involve masking elements of the graph and observing the corresponding changes to the output predictions (e.g., GNNExplainer), methods based on gradients back-propagation (e.g., Gradient-weighted Class Activation Mapping), decomposition methods (e.g., GNN-LRP), surrogate methods (e.g., GraphLIME), and/or model-level explainer methods (e.g., XGNN), among other possibilities.

Further, in accordance with the present disclosure, the explainer technique that is utilized by the explainability component 208b may be tailored to the use case for which the graph analysis pipeline is configured. For example, in a scenario where the explainability component 208b is configured to utilize a method based on reinforcement learning, the reward function may be tailored based on the use case, such as by employing a set of rules that are defined based on business knowledge and domain expertise, in order to produce explainer data that is more tailored to the use case.

Further yet, the explainer data that is output by the explainability component 208b may be presented to a user in any of various forms. For instance, in a scenario where the explainer data takes the form of data indicating a particular subset of nodes, edges, and/or features that were most impactful to a prediction, such explainer data may be presented by virtue of highlighting the particular subset of nodes, edges, and/or features within a visualization of the graph, among various other possibilities.

The integration-into-application-systems component 208c may be configured to act as an interface between the graph analysis pipeline and one or more other systems of an organization that is deploying the graph analysis pipeline. For instance, the integration-into-application-systems component 208c may be configured to communicate one or more outputs generated by any of the components of the subsystem 200 to another system of the organization for purposes of controlling an operation of the other system. As examples, the integration-into-application-systems component 208c may be configured to serve as a streamlining tool for the data pre-processing component 204b, in the sense that the explanation resulting from the explainability component 208b may suggest set of handcrafted features (rulesets) to be devised, or the data ingestion component 204a be modified to create more graph based features that are deemed important in the embedding generation and model prediction.

The visualization and explainer subsystem 208 may include various other sub-components and perform various other functions as well.

Further, in practice, a user may interact with the visualization and explainer subsystem 208 via an API or the like, which may comprise the same API utilized to interact with the pipeline configuration system 202 or a different API.

Advantageously, these sub-components of the visualization and explainer subsystem 208 may enable information about the input dataset and/or the intended use case of a graph data science model to be utilized to customize the training, evaluation, and/or updating of the graph data science model.

e. Platform Subsystem

At a high level, the platform subsystem 210 may be configured to manage and allocate the computing resources of the computing platform that are used to deploy a graph analysis pipeline (e.g., managing and allocating computing resources in a way that helps improve performance and/or cost when executing the pipeline). The platform subsystem 210 may accomplish these tasks in various ways, and in some examples, the platform subsystem 210 may include one or more sub-components for managing and allocating the computing resources in a way that helps improve performance and/or cost when executing the pipeline. For instance, as shown in FIG. 2, the platform subsystem 210 may include one or more of (i) a resource allocation component 210a, (ii) a graphics processing unit (GPU) scaling component 210b, (iii) a central processing unit (CPU) scaling component 210c, and (iv) a precision policy component 210d.

The resource allocation component 210a may be configured to determine the extent and/or type of computing resources (both physical and virtual) that are to be allocated for the deployment of a graph analysis pipeline (e.g., the computing resources utilized by the graph model construction subsystem 204, the graph analytics and model subsystem 206, and/or the visualization and explainer subsystem 208 to deploy the graph analysis pipeline). In this respect, the resource allocation component 210a may determine the extent and/or type of computing resources (e.g., how many processing cores, how much memory, etc.) based on factors such as (i) the size of the input dataset, (ii) an estimate of the extent of computing resources that will be required to execute the graph analysis pipeline, and (iii) an expected real-world performance of the computing resources that are to be allocated for the deployment of a graph analysis pipeline (which may differ from the theoretical performance of the computing resources), among others.

The GPU scaling component 210b may be configured to scale the GPU computing resources that are utilized for the deployment of a graph analysis pipeline (e.g., the GPU computing resources utilized by the graph model construction subsystem 204, the graph analytics and model subsystem 206, and/or the visualization and explainer subsystem 208 when the graph analysis pipeline is deployed). The GPU scaling component 210b may apply this scaling to a single GPU or to multiple GPUs.

The CPU scaling component 210c may be configured to scale the CPU computing resources that are utilized for the deployment of a graph analysis pipeline (e.g., the CPU computing resources utilized by the graph model construction subsystem 204, the graph analytics and model subsystem 206, and/or the visualization and explainer subsystem 208 when the graph analysis pipeline is deployed). The CPU scaling component 210c may apply this scaling to a single CPU or to multiple CPUs.

The precision policy component 210d may be configured to establish the precision policy that is utilized for the deployment of a graph analysis pipeline (e.g., the level of precision used by the graph model construction subsystem 204, the graph analytics and model subsystem 206, and/or the visualization and explainer subsystem 208 when performing computations in accordance with the graph analysis pipeline). In line with the discussion above, this precision policy may then be referenced by other functional subsystems when performing functions in accordance with the graph analysis pipeline. The precision policy established by the precision policy component 210d may be based on information about the intended use case of the graph data science model, the computing resources that are to be used to deploy the graph analysis pipeline, and/or business knowledge, among other possibilities.

The platform subsystem 210 may include various other sub-components and perform various other functions as well.

Advantageously, these sub-components of the platform subsystem 210 may enable a graph analysis pipeline to be executed in a way that is better suited for deployment in a cloud computing environment.

IV. Example Graph Data Science Model

In line with the discussion above, the disclosed technology may be utilized to build any of various different types of graph data science models and corresponding pipelines for executing such graph data science models. One possible example 400 of a pipeline for executing a graph data science model that may be configured and deployed in accordance with the present disclosure is illustrated in FIG. 4.

Figure 4:
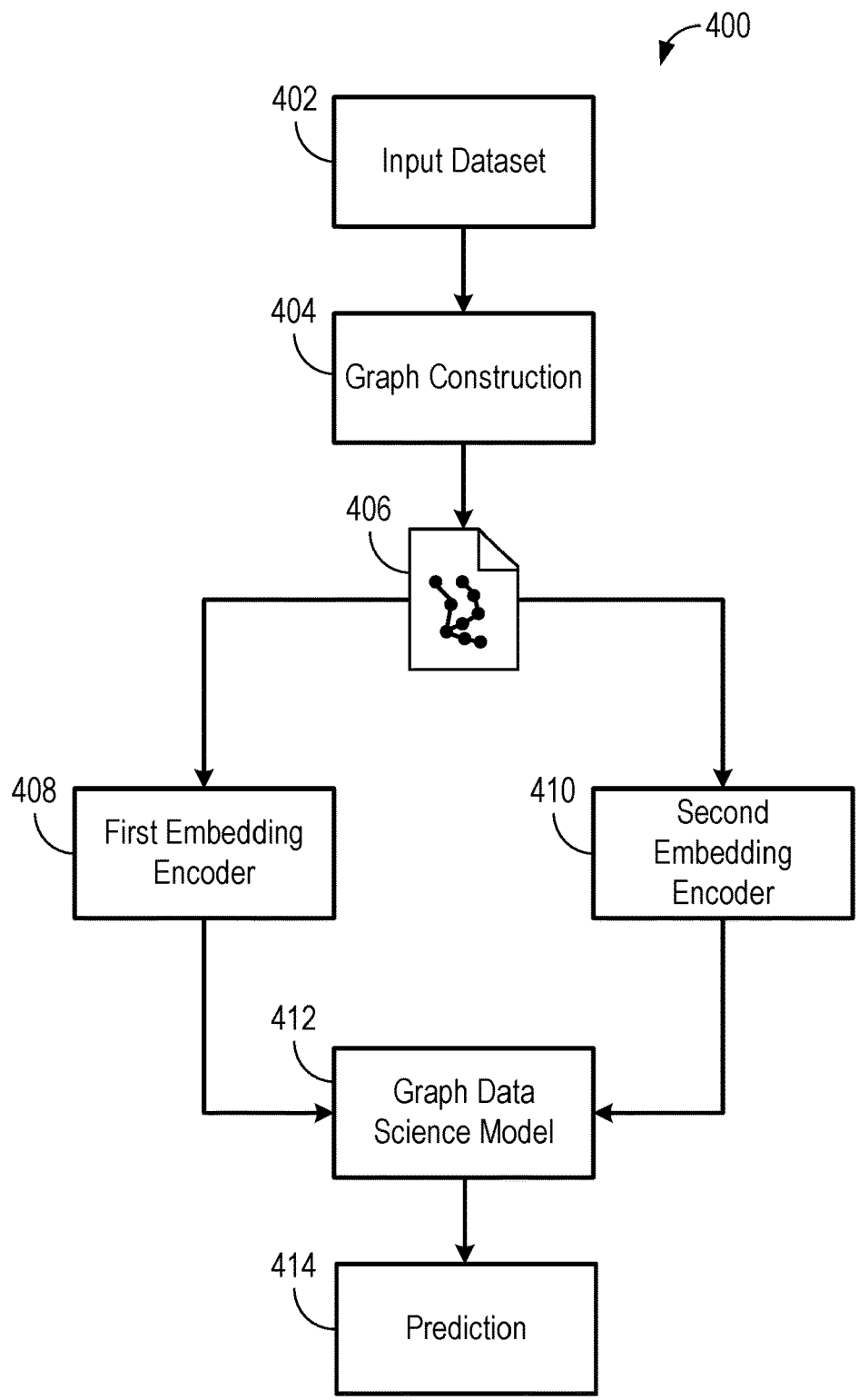
FIG. 4 depicts one example of a pipeline for executing a graph data science model that may be configured and deployed according to aspects of the disclosed technology.

As shown in FIG. 4, the first stage of the example pipeline 400 may function to obtain an input dataset 402 that is to be evaluated using the example pipeline 400. In line with the discussion above, the input dataset 402 that is obtained may take any of various forms, which may depend on the use case, and in at least some implementations, may include data records from one or more data sources that are in raw and/or pre-processed form (perhaps including data records that have previously been constructed into a graph form).

The second stage of the example pipeline 400 may comprise a graph construction component 404 that functions to construct a data graph 406 based on the input dataset 402. For example, the graph construction component 404 may construct the data graph 406 by encoding the input dataset 402 into a data graph that includes a set of nodes, a set of edges connecting various nodes in the set of nodes, and a set of attributes for each node in the set of nodes.

In turn, the third stage of the example pipeline 400 may comprise a pair of encoders that are configured to generate and output two different types of embedding vectors for one or more nodes within the data graph 406, which are shown as a first embedding encoder 408 and a second embedding encoder 410. The first embedding encoder 408 and second embedding encoder 410 may each take any of various forms. For instance, in one possible implementation, the first embedding encoder 408 may be configured to generate a first type of embedding vectors for the one or more nodes within the data graph 406 using a shallow embedding technique, such as a DeepWalk or Node2Vec technique, and the second embedding encoder 410 may be configured to generate a second type of embedding vectors for the one or more nodes within the data graph 406 using a deep embedding technique, such as a GraphSAGE, GCN, or column networks technique. However, many other implementations of the first embedding encoder 408 and second embedding encoder 410 are possible as well. Further, in line with the discussion above, the first embedding encoder 408 and second embedding encoder 410 may be re-trained at the same frequency or at different frequencies, where such different frequencies may be determined based on cost and/or other factors.

The second embedding encoder 410 may further be configured to generate a second type of embedding vectors for the one or more nodes within the data graph 406 using a deep embedding technique utilizing either node labels, links (edges) between nodes, or both. In the case of using links between nodes, the encoder 410 performs negative sampling. The goal of negative sampling is to provide the encoder with examples of node pairs (links) that are not connected in the constructed graph data 406 but are highly similar to positive examples (actual node pairs/links in 406). In doing so, the encoder 410 is trained on positive and negative examples such that the generated embedding vectors can better distinguish between nodes that are linked in 406 and those that are not. There are various ways to generate negative examples. One way is to use random walks where the nodes that are far from each other in the graph are identified through some randomized process. In this case the second embedding encoder 410 may leverage random walks generated from shallow embedding technique such as DeepWalk or Node2Vec used in the first embedding encoder 408.

In line with the discussion above, the second embedding encoder 410 may be used to identify missing links in the constructed graph data 406 based on the generated embedding vectors for the one or more nodes in the graph. The missing links can be added so that the graph data 406 can be modified accordingly. The process of identifying the missing links, updating the graph data 406, and updating the node embeddings generated from the embedding encoder 408 and 410 may be configured to be iterative until no missing links are predicted by the second embedding encoder 410 or some stopping criteria is satisfied.

After the two types of embedding vectors are generated for the one or more nodes, the example pipeline 400 may then utilize the generated embedding vectors (perhaps along with attribute data) for the one or more nodes and a graph data science model 412 to render a respective prediction 414 for each of the one or more nodes. This function of utilizing the generated embedding vectors and the graph data science model 412 to render the respective prediction 414 for each of the one or more nodes may take various forms, which may depend on the type of graph data science model 412.

According to one possible implementation, the graph data science model 412 may comprise a combination of two intermediate graph data science models: (i) a first intermediate graph data science model that is configured to render a given type of prediction related to a node within the data graph 406 based on a first type of embedding vector for the node that is output by the first embedding encoder 408 (and perhaps also attribute data for the node) and (ii) a second intermediate graph data science model that is configured to render the same given type of prediction related to the node within the data graph 406 based on a second type of embedding vector for the node that is output by the second embedding encoder 410 (and perhaps also attribute data for the node). In such an implementation, the first and second types of embedding vectors that are generated for a node (and perhaps also attribute data for the node) may be input into the graph data science model 412, and the graph data science model 412 may then function to (i) render a first prediction based on the first type of embedding vector (and perhaps also attribute data for the node) using the first intermediate graph data science model, (ii) render a second prediction based on the second type of embedding vector (and perhaps also attribute data for the node) using the second intermediate graph data science model, (iii) combine the first and second predictions together in some manner (e.g., a weighted linear combination) in order to produce a single, combined prediction 414 for the node.

In this implementation, the intermediate graph data science models that form the basis for the combined graph data science model 412 may each be trained using any of various machine learning techniques, including but not limited to a neural network technique, a regression technique, a kNN technique, a decision-tree technique, a SVM technique, a Bayesian technique, an ensemble technique, a clustering technique, an association-rule-learning technique, a dimensionality reduction technique, an optimization technique such as gradient descent, a regularization technique, and/or a reinforcement technique, among other possible types of machine learning techniques. Further, the training data that is to be used to train each of the intermediate graph data science model may take the form of embedding vectors that are derived for nodes within a training graph and perhaps also attribute data for such nodes, along with corresponding labels indicating desired predictions of the intermediate graph data science model for the nodes. In this respect, the embedding vectors that are used to train the first intermediate graph data science model may be derived using the same technique employed by the first embedding encoder 408 to generate embedding vectors, and the embedding vectors that are used to train the second intermediate graph data science model may be derived using the same technique employed by the second embedding encoder 408 to generate embedding vectors. The intermediate graph data science models that form the basis for the combined graph data science model 412 may take other forms as well.

According to another possible implementation, the graph data science model 412 may comprise a graph data science model that is configured to render a given type of prediction related to a node within the data graph 406 based on a combined embedding vector for the node (and perhaps also attribute data for the node). In such an implementation, the example pipeline 400 may include additional logic for combining the two types of embedding vectors generated for a node into a single, combined embedding vector that is then input into the graph data science model 412. While this additional logic is not shown in FIG. 4, it would typically sit between the embedding encoders 408/410 and the graph data science model 412, and such additional logic may take any of various forms. For instance, as one possibility, the additional logic may be configured to concatenate the two types of embedding vectors for a node together to create a single, concatenated embedding vector for the node (e.g., a vector comprising a collection of all feature variables that were included in the two individual embedding vectors), which may then serve as an input into the graph data science model 412 (perhaps along with attribute data for the node). As another possibility, the additional logic may be configured to (i) concatenate the two types of embedding vectors for a node together to create a single, concatenated embedding vector for the node and then (ii) input the concatenated embedding vector for the node into a neural network (or the like) that produces a lower-dimension version of the concatenated embedding vector for the node, which may then serve as an input into the graph data science model 412 (perhaps along with attribute data for the node). The additional logic for combining the two types of embedding vectors generated for a node into a single, combined embedding vector that is then input into the graph data science model 412 may take other forms as well.

In this implementation, the graph data science model 412 may be trained using any of various machine learning techniques, including but not limited to a neural network technique, a regression technique, a kNN technique, a decision-tree technique, a SVM technique, a Bayesian technique, an ensemble technique, a clustering technique, an association-rule-learning technique, a dimensionality reduction technique, an optimization technique such as gradient descent, a regularization technique, and/or a reinforcement technique, among other possible types of machine learning techniques. Further, the training data that is to be used to train the graph data science model 412 may take the form of combined embedding vectors that are derived for nodes within a training graph and perhaps also attribute data for such nodes, along with corresponding labels indicating desired predictions of the graph data science model for the nodes. In this respect, the combined embedding vectors that are used to train the graph data science model 412 may be derived using the same technique employed by the additional logic of example pipeline 400 to combine the embedding vectors produced by the first and second embedding encoders. The graph data science model 412 may take other forms as well.

It should be understood that example pipeline 400 is merely presented for purposes of illustration, and that various other examples of pipelines for executing a graph data science model (or performing other data analytics operations) in order to derive insights regarding nodes and/or edges within a graph are possible as well.

Figure 5A:
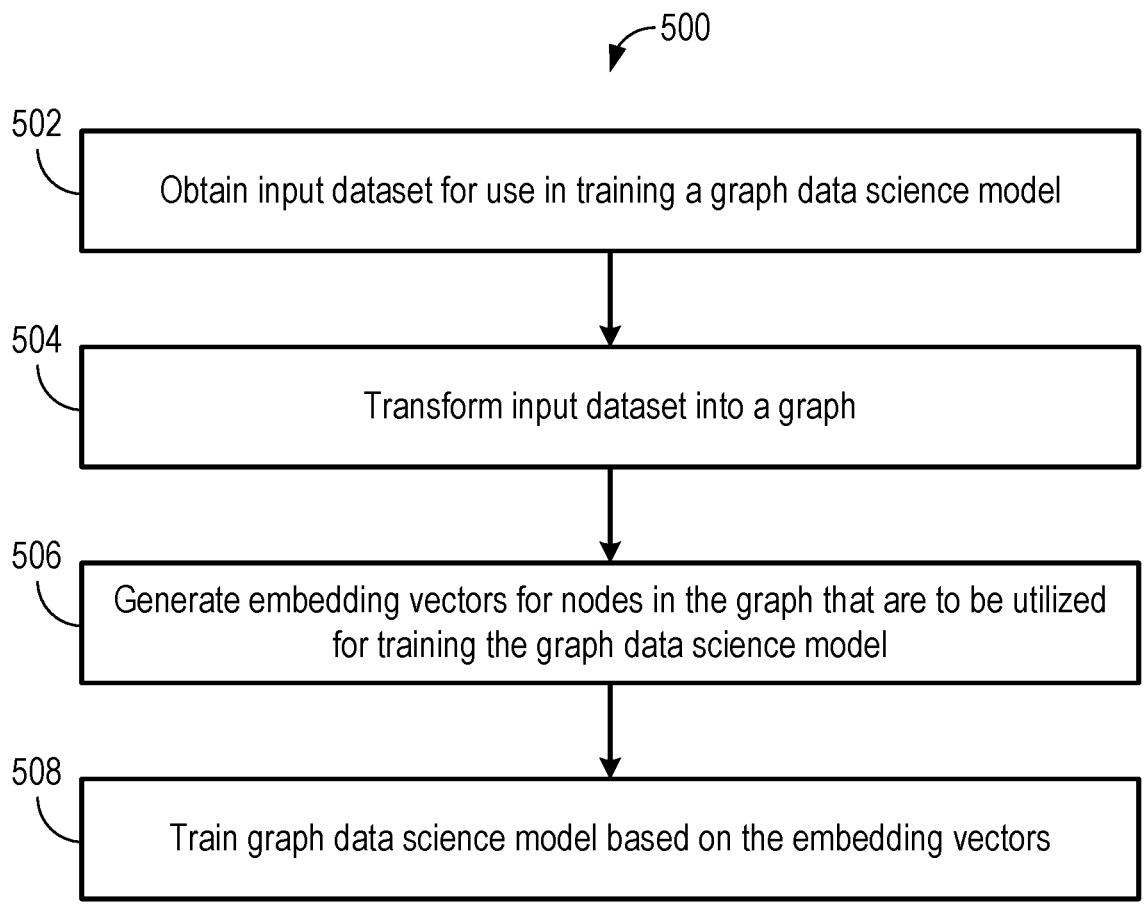
FIG. 5A depicts a flow diagram of an example process that may be carried out by a computing platform in accordance with a graph analysis pipeline for training a graph data science model.

Turning now to FIG. 5A, a flow diagram of an example process 500 that may be carried out by a computing platform in accordance with a graph analysis pipeline for training a graph data science model is shown. For purposes of illustration only, the example process is described as being carried out the subsystem 200 of FIG. 2, but it should be understood that the example process may be carried out by a functional subsystem that takes other forms as well. Further, it should be understood that, in practice, these functions may be encoded in the form of program instructions that are executable by one or more processors of a computing platform. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 5A, example process 500 may begin at block 502 with the subsystem 200 obtaining an input dataset for use in training a graph data science model, which may take any of various forms depending on the use case-including but not limited to any of the various forms described herein.

In turn, at block 504, the subsystem 200 may transform the obtained input dataset into a graph, which may likewise take any of various forms depending on the use case-including but not limited to any of the various forms described herein.

At block 506, after transforming the obtained input dataset into the graph, the subsystem 200 may generate one or more types of embedding vectors for nodes within the graph that are to be utilized for training the graph data science model. For instance, in one embodiment, the subsystem 200 may generate two types of embedding vectors for nodes within the graph: (i) a first type of embedding vectors that are generated using a shallow embedding technique and (ii) a second type of embedding vectors that are generated using a deep embedding technique. Other embodiments are possible as well. Further, the nodes for which the one or more types of embedding vectors are generated may take comprise all nodes within the graph or some subset thereof (e.g., only nodes of a certain type).

At block 508, after generating the one or more types of embedding vectors for the nodes within the graph, the subsystem 200 may train a graph data science model based on the one or more types of embedding vectors. This function may take various forms, which may depend on the type of graph data science model that is to be trained.

For instance, as discussed above, one possible implementation of the graph data science model may comprise a combination of two intermediate graph data science models: (i) a first intermediate graph data science model that is configured to render a given type of prediction related to a node within the graph based on a first type of embedding vector for the node (and perhaps also attribute data for the node) and (ii) a second intermediate graph data science model that is configured to render the same given type of prediction related to the node within the graph based on a second type of embedding vector for the node (and perhaps also attribute data for the node). In such an implementation, the first intermediate graph data science model may be trained by applying one or more machine learning techniques to training data that comprises the first type of embedding vectors derived for the nodes within the graph and perhaps also attribute data for such nodes, along with corresponding labels indicating desired predictions of the intermediate graph data science model for the nodes, and the second intermediate graph data science model may be trained by applying one or more machine learning techniques to training data that comprises the second type of embedding vectors derived for the nodes within the graph and perhaps also attribute data for such nodes, along with corresponding labels indicating desired predictions of the intermediate graph data science model for the nodes.

Another possible implementation of the graph data science model may comprise a graph data science model that is configured to render a given type of prediction related to a node within the graph based on a combined embedding vector for the node (and perhaps also attribute data for the node). In such an implementation, the graph data science model may be trained by applying one or more machine learning techniques to training data that comprises combined embedding vectors that are derived from the first and second types of embedding vectors for nodes within the graph and perhaps also attribute data for such nodes, along with corresponding labels indicating desired predictions of the graph data science model for the nodes.

The function of training the graph data science model based on the one or more types of embedding vectors may take various other forms as well.

Figure 5B:
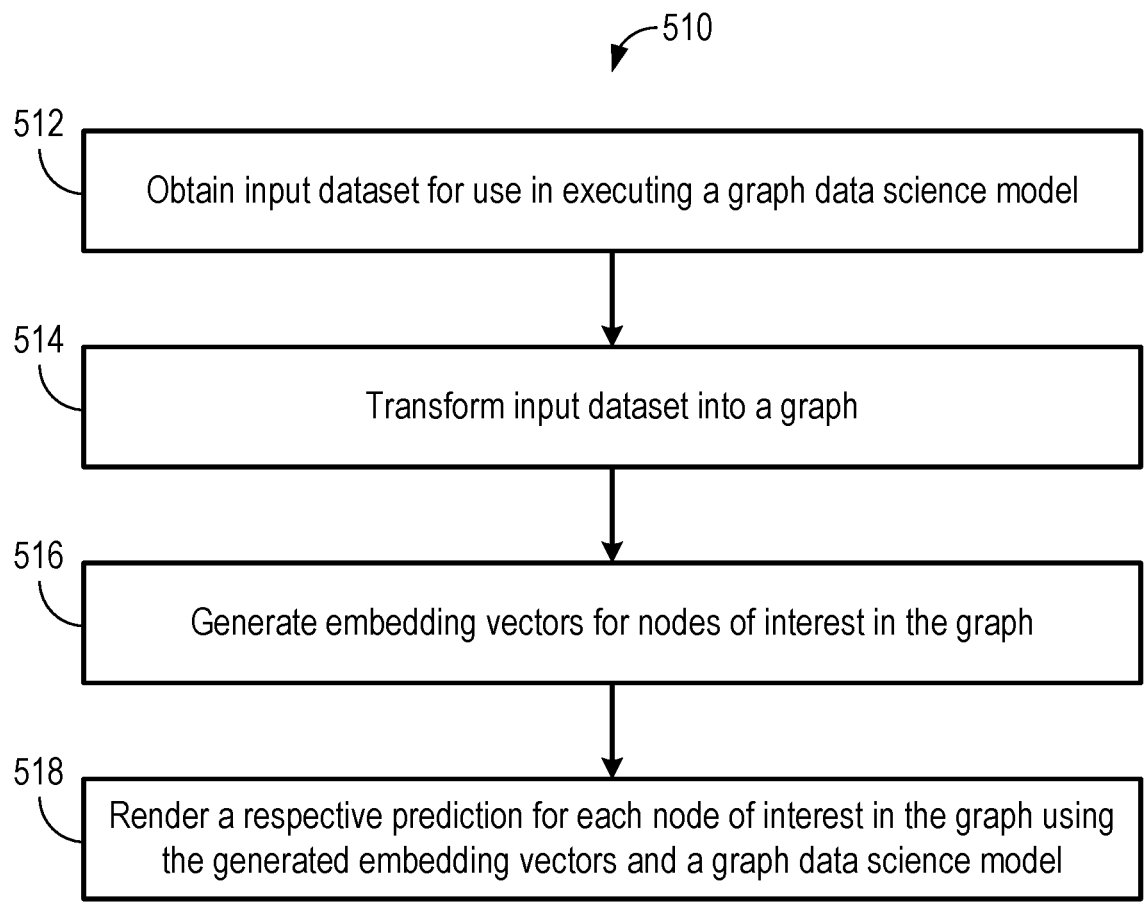
FIG. 5B depicts a flow diagram of an example process that may be carried out by a computing platform in accordance with a graph analysis pipeline for executing a graph data science model.

Turning next to FIG. 5B, a flow diagram of an example process 510 that may be carried out by a computing platform in accordance with a graph analysis pipeline for executing a graph data science model is shown. For purposes of illustration only, the example process is described as being carried out the subsystem 200 of FIG. 2, but it should be understood that the example process may be carried out by a functional subsystem that takes other forms as well. Further, it should be understood that, in practice, these functions may be encoded in the form of program instructions that are executable by one or more processors of a computing platform. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 5B, example process 500 may begin at block 512 with the subsystem 200 obtaining an input dataset for use in executing a graph data science model, which may take any of various forms depending on the use case-including but not limited to any of the various forms described herein.

In turn, at block 514, the subsystem 200 may transform the obtained input dataset into a graph, which may likewise take any of various forms depending on the use case-including but not limited to any of the various forms described herein.

At block 516, after transforming the obtained input dataset into the graph, the subsystem 200 may generate one or more types of embedding vectors for nodes of interest within the graph. For instance, in one embodiment, the subsystem 200 may generate two types of embedding vectors for the nodes of interest within the graph: (i) a first type of embedding vectors that are generated using a shallow embedding technique and (ii) a second type of embedding vectors that are generated using a deep embedding technique. Other embodiments are possible as well. Further, the nodes of interest for which the one or more types of embedding vectors are generated may take comprise all nodes within the graph or some subset thereof (e.g., only nodes of a certain type or only nodes from a certain portion of the graph).

At block 518, after generating the one or more types of embedding vectors for the nodes of interest within the graph, the subsystem 200 may utilize the generated embedding vectors (perhaps along with attribute data) for the nodes of interest and a graph data science model to render a respective prediction for each of the nodes of interest. This function may take various forms, which may depend on the type of graph data science model that is utilized by the pipeline.

For instance, as discussed above, one possible implementation of the graph data science model may comprise a combination of two intermediate graph data science models: (i) a first intermediate graph data science model that is configured to render a given type of prediction related to a node within the graph based on a first type of embedding vector for the node (and perhaps also attribute data for the node) and (ii) a second intermediate graph data science model that is configured to render the same given type of prediction related to the node within the graph based on a second type of embedding vector for the node (and perhaps also attribute data for the node). In such an implementation, the function of utilizing the generated embedding vectors (perhaps along with attribute data) for the nodes of interest and the graph data science model to render a respective prediction for each of the nodes of interest may involve inputting the first and second types of embedding vectors that are generated for a node (and perhaps also attribute data for the node) into the graph data science model, which may function to (i) render a first intermediate prediction based on the first type of embedding vector (and perhaps also attribute data for the node) using the first intermediate graph data science model, (ii) render a second intermediate prediction based on the second type of embedding vector (and perhaps also attribute data for the node) using the second intermediate graph data science model, (iii) combine the first and second intermediate predictions together in some manner (e.g., a weighted linear combination) in order to produce a single, combined prediction for the node.

Another possible implementation of the graph data science model may comprise a graph data science model that is configured to render a given type of prediction related to a node within the graph based on a combined embedding vector for the node (and perhaps also attribute data for the node). In such an implementation, the function of utilizing the generated embedding vectors (perhaps along with attribute data) for the nodes of interest and the graph data science model to render a respective prediction for each of the nodes of interest may involve (i) combining the two types of embedding vectors generated for a node into a single, combined embedding vector for the node using logic similar to that described above, and then (ii) inputting the combined embedding vector for the node (and perhaps also attribute data for the node) into the graph data science model, which may function to render a prediction related to the node based on the combined embedding vector for the node (and perhaps also attribute data for the node).

The function of utilizing the generated embedding vectors (perhaps along with attribute data) for the nodes of interest and the graph data science model to render a respective prediction for each of the nodes of interest may take various other forms as well.

V. Example Computing Platform

Figure 6:
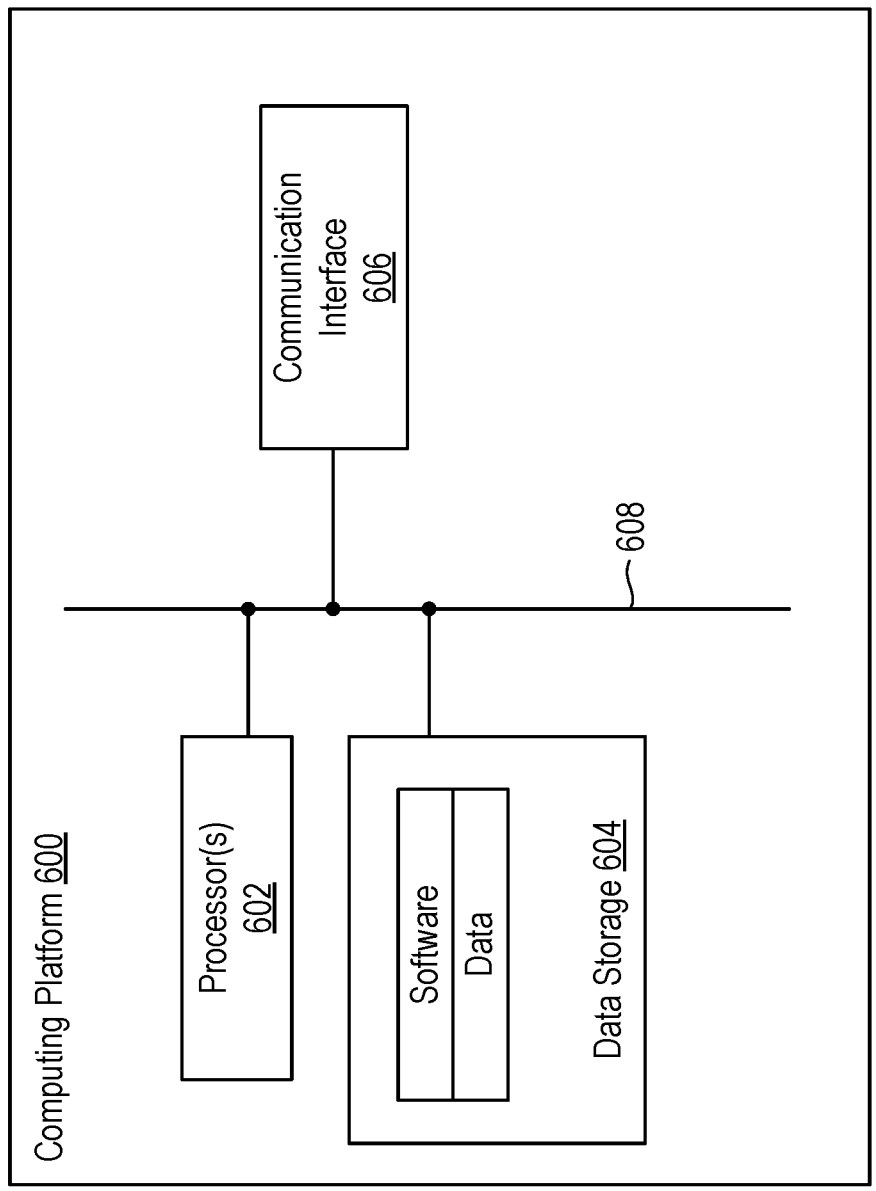
FIG. 6 depicts example structural components of an example computing platform that may be configured to perform various functions of the functional subsystem of FIG. 2 according to aspects of the disclosed technology.

Turning now to FIG. 6, a simplified block diagram is provided to illustrate some structural components that may be included in an example computing platform 600, which may be configured to host and execute the new software technology disclosed herein. As shown in FIG. 6, the example computing platform 600 may include at least a processor 602, data storage 604, and a communication interface 606, all of which may be communicatively linked by a communication link 608 that may take the form of a system bus, a communication network such as a public, private, or hybrid cloud, or some other connection mechanism.

Processor 602 may comprise one or more processing components, such as general-purpose processors (e.g., a single- or multi-core CPU), special-purpose processors (e.g., a GPU, application-specific integrated circuit (ASIC), or digital-signal processor (DSP)), programmable logic devices (e.g., a field programmable gate array), controllers (e.g., microcontrollers), and/or any other processor components now known or later developed. In line with the discussion above, it should also be understood that processor 602 could comprise processing components that are distributed across a plurality of physical computing devices connected via a network, such as a computing cluster of a public, private, or hybrid cloud.

In turn, data storage 604 may comprise one or more non-transitory computer-readable storage mediums that are collectively configured to store (i) program instructions that are executable by processor 602 such that computing platform 600 is configured to perform certain functions in connection with building and executing a deep learning-based pipeline, and (ii) data that may be received, derived, or otherwise stored, for example, in one or more databases, file systems, repositories, or the like, by computing platform 600, in connection with building and executing a deep learning-based pipeline. In this respect, the one or more non-transitory computer-readable storage mediums of data storage 604 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 604 may comprise computer-readable storage mediums that are distributed across a plurality of physical computing devices connected via a network, such as a storage cluster of a public, private, or hybrid cloud. Data storage 604 may take other forms and/or store data in other manners as well.

Communication interface 606 may be configured to facilitate wireless and/or wired communication with client stations (e.g., one or more client stations 108 of FIG. 1) and/or third-party computing platforms. Additionally, in an implementation where the computing platform 600 comprises a plurality of physical computing devices connected via a network, communication interface 606 may be configured to facilitate wireless and/or wired communication between these physical computing devices (e.g., between computing and storage clusters in a cloud network). As such, communication interface 606 may take any suitable form for carrying out these functions, examples of which may include an Ethernet interface, a Wi-Fi network, a cellular network, a serial bus interface (e.g., Firewire, USB 3.0, etc.), a chipset and antenna adapted to facilitate wireless communication, short-range wireless protocols, one or more APIs and/or an API gateway, and/or any other interface that provides for wireless and/or wired communication. Communication interface 606 may also include multiple communication interfaces of different types. Other configurations are possible as well.

Although not shown, the computing platform 600 may additionally include or have an interface for connecting to user-interface components that facilitate user interaction with computing platform 600, such as a keyboard, a mouse, a trackpad, a display screen, a touch-sensitive interface, a stylus, a virtual-reality headset, and/or speakers, among other possibilities.

It should be understood that the computing platform 600 is one example of a computing platform that may be used with the embodiments described herein. Numerous other arrangements are possible and contemplated herein. For instance, in other embodiments, the computing platform 600 may include additional components not pictured and/or more or fewer of the pictured components.

VI. Conclusion

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:
1. A computing platform comprising:
a network interface;
at least one processor;
at least one non-transitory computer-readable medium; and
program instructions stored on the at least one non-transitory computer-readable medium that are executable by the at least one processor such that the computing platform is configured to:
receive, from a client device via the network interface, configuration information for a graph analysis pipeline;
based on the received configuration information, deploy the graph analysis pipeline, wherein the graph analysis pipeline functions to:
obtain an input dataset from either or both of (i) one or more data sources that are internal to the computing platform and (ii) one or more data sources that are external to the computing platform and accessible via one or more networks;

construct a graph from the input dataset;

for a given node within the constructed graph, generate a first type of embedding vector using a first embedding technique and a second type of embedding vector using a second embedding technique that differs from the first embedding technique, wherein the first type is different from the second type; and input the first and second types of embedding vectors for the given node into a graph data science model that is run on the computing platform and is configured to render a given prediction for the given node by (i) using a first intermediate graph data science model to render a first intermediate prediction based at least in part on the first type of embedding vector, (ii) using a second intermediate graph data science model to render a second intermediate prediction based at least in part on the second type of embedding vector, and (iii) combining the first and second intermediate predictions to produce the given prediction for the given node as an output that comprises a combination of the first and second intermediate predictions, wherein the second intermediate graph data science model is different from the first intermediate graph data science model.

2. The computing platform of claim 1, wherein the first embedding technique comprises a shallow embedding technique and the second embedding technique comprises a deep embedding technique.

3. The computing platform of claim 1, wherein one or both of (i) the first intermediate graph data science model renders the first intermediate prediction based further on attribute data for the given node and (ii) the second intermediate graph data science model renders the second intermediate prediction based further on attribute data for the given node.

4. The computing platform of claim 1, wherein the graph has a configuration that is tailored for a particular use case of the graph.

5. The computing platform of claim 1, wherein the graph comprises a heterogenous graph that includes two or more different types of nodes.

6. The computing platform of claim 5, wherein the given prediction for the given nodes comprises a prediction related to financial activity of a given customer of a financial institution, and wherein the two or more different types of nodes comprise two or more of customer nodes, merchant nodes, or transaction nodes.

7. The computing platform of claim 1, wherein the one or more data sources that are internal to the computing platform comprise one or more internal data stores that contain one or both of raw and pre-processed data.

8. The computing platform of claim 1, wherein the graph comprises a set of nodes having associated attribute data and a set of edges that connect a respective pair of nodes.

9. The computing platform of claim 1, wherein the first intermediate graph data science model and the second intermediate graph data science model are trained using a respective machine learning process.

10. The computing platform of claim 1, wherein combining the first and second intermediate predictions to produce the given prediction for the given node as an output comprises generating a weighted, linear combination of the first and second intermediate predictions.

11. A non-transitory computer-readable medium comprising program instructions that, when executed by at least one processor, cause a computing platform to:

receive, from a client device via a network interface of the computing platform, configuration information for a graph analysis pipeline; and based on the received configuration information, deploy the graph analysis pipeline, wherein the graph analysis pipeline functions to:

obtain an input dataset from either or both of (i) one or more data sources that are internal to the computing platform and (ii) one or more data sources that are external to the computing platform and accessible via one or more networks;

construct a graph from the input dataset;

for a given node within the constructed graph, generate a first type of embedding vector using a first embedding technique and a second type of embedding vector using a second embedding technique that differs from the first embedding technique, wherein the first type is different from the second type; and input the first and second types of embedding vectors for the given node into a graph data science model that is run on the computing platform and is configured to render a given prediction for the given node by (i) using a first intermediate graph data science model to render a first intermediate prediction based at least in part on the first type of embedding vector, (ii) using a second intermediate graph data science model to render a second intermediate prediction based at least in part on the second type of embedding vector, and (iii) combining the first and second intermediate predictions to produce the given prediction for the given node as an output that comprises a combination of the first and second intermediate predictions, wherein the second intermediate graph data science model is different from the first intermediate graph data science model.

12. The non-transitory computer-readable medium of claim 11, wherein the first embedding technique comprises a shallow embedding technique and the second embedding technique comprises a deep embedding technique.

13. The non-transitory computer-readable medium of claim 11, wherein the graph has a configuration that is tailored for a particular use case of the graph.

14. The non-transitory computer-readable medium of claim 11, wherein the graph comprises a heterogenous graph that includes two or more different types of nodes.

15. The non-transitory computer-readable medium of claim 14, wherein the given prediction for the given nodes comprises a prediction related to financial activity of a given customer of a financial institution, and wherein the two or more different types of nodes comprise two or more of customer nodes, merchant nodes, or transaction nodes.

16. The non-transitory computer-readable medium of claim 11, wherein one or both of (i) the first intermediate graph data science model renders the first intermediate prediction based further on attribute data for the given node and (ii) the second intermediate graph data science model renders the second intermediate prediction based further on attribute data for the given node.

17. A computer-implemented method comprising:

receiving, from a client device, configuration information for a graph analysis pipeline;

based on the received configuration information, deploying, by a computing platform, the graph analysis pipeline, wherein the graph analysis pipeline functions to:

obtain an input dataset from either or both of (i) one or more data sources that are internal to the computing platform and (ii) one or more data sources that are external to the computing platform and accessible via one or more networks;

construct a graph from the input dataset;

for a given node within the constructed graph, generate a first type of embedding vector using a first embedding technique and a second type of embedding vector using a second embedding technique that differs from the first embedding technique, wherein the first type is different from the second type; and input the first and second types of embedding vectors for the given node into a graph data science model that is run on the computing platform and is configured to render a given prediction for the given node by (i) using a first intermediate graph data science model to render a first intermediate prediction based at least in part on the first type of embedding vector, (ii) using a second intermediate graph data science model to render a second intermediate prediction based at least in part on the second type of embedding vector, and (iii) combining the first and second intermediate predictions to produce the given prediction for the given node as an output that comprises a combination of the first and second intermediate predictions, wherein the second intermediate graph data science model is different from the first intermediate graph data science model.

18. The computer-implemented method of claim 17, wherein the first embedding technique comprises a shallow embedding technique and the second embedding technique comprises a deep embedding technique.

19. The computer-implemented method of claim 17, wherein one or both of (i) the first intermediate graph data science model renders the first intermediate prediction based further on attribute data for the given node and (ii) the second intermediate graph data science model renders the second intermediate prediction based further on attribute data for the given node.

20. The computer-implemented method of claim 17, wherein combining the first and second intermediate predictions to produce the given prediction for the given node as an output comprises generating a weighted, linear combination of the first and second intermediate predictions.

* * * * *